(12) United States Patent
Shimizu et al.

(10) Patent No.: US 8,946,966 B2
(45) Date of Patent: Feb. 3, 2015

(54) ELECTRIC ROTATING MACHINE

(71) Applicant: Yamaha Hatsudoki Kabushiki Kaisha, Shizuoka-Ken (JP)

(72) Inventors: Tsukasa Shimizu, Shizuoka-ken (JP); Haruyoshi Hino, Shizuoka-ken (JP)

(73) Assignee: Yamaha Hatsudoki Kabushiki Kaisha, Iwata-shi (JP)

( * ) Notice: Subject to any disclaimer, the term of this patent is extended or adjusted under 35 U.S.C. 154(b) by 144 days.

(21) Appl. No.: 13/723,188

(22) Filed: Dec. 20, 2012

(65) Prior Publication Data

US 2013/0162088 A1 Jun. 27, 2013

(30) Foreign Application Priority Data

Dec. 22, 2011 (JP) ................................. 2011-281398
Oct. 15, 2012 (JP) ................................. 2012-227651

(51) Int. Cl.
*H02K 1/06* (2006.01)
*H02K 21/02* (2006.01)
*H02K 3/18* (2006.01)
*H02K 1/27* (2006.01)

(52) U.S. Cl.
CPC ................ *H02K 1/06* (2013.01); *H02K 21/028* (2013.01); *H02K 3/18* (2013.01); *H02K 2213/03* (2013.01); *H02K 1/276* (2013.01)
USPC .......................................... 310/209; 310/191

(58) Field of Classification Search
USPC ................................................ 310/191, 209
See application file for complete search history.

(56) References Cited

U.S. PATENT DOCUMENTS

| 7,550,894 | B2 | 6/2009 | Hino et al. |
| 7,906,844 | B2 | 3/2011 | Cui et al. |
| 7,906,884 | B2 * | 3/2011 | Hino et al. ................... 310/191 |
| 7,948,144 | B2 * | 5/2011 | Noda ..................... 310/216.001 |
| 8,093,776 | B2 | 1/2012 | Hino et al. |

FOREIGN PATENT DOCUMENTS

| EP | 1 670 124 A2 | 6/2006 |
| JP | 2006-191782 A | 7/2006 |
| JP | 2007-215289 | 8/2007 |
| JP | 4120208 | 7/2008 |

OTHER PUBLICATIONS

Taiwanese Office Action, issued on Sep. 18, 2014, in connection with the counterpart Taiwanese application No. 101148496, pp. 1-7 (and Taiwanese Search Report, 1 page).

* cited by examiner

*Primary Examiner* — Dang Le
(74) *Attorney, Agent, or Firm* — Rabin & Berdo, P.C.

(57) ABSTRACT

An electric rotating machine is provided. A tooth portion of a stator is divided into a first tooth portion and a second tooth portion that are movable relative to each other between a first position, in which a magnetic resistance between the first and second tooth portions is small, and a second position, in which the magnetic resistance is relatively large. In a state in which the second tooth portion is in the second position, a region from a stator yoke portion side end of a current-carrying winding disposed around the tooth portion to a rotor side end of a winding arrangeable region is divided into a first region and a second region. A current-carrying winding space factor in the first region is set to be relatively smaller than in the second region.

20 Claims, 16 Drawing Sheets

ELECTRIC ROTATING MACHINE

CROSS-REFERENCE TO RELATED APPLICATIONS

This application claims priority under 35 U.S.C. §119 to Japanese Patent Application No. 2011-281398 filed on Dec. 22, 2011 and Japanese Patent Application No. 2012-227651 filed on Oct. 15, 2012, the entire disclosures of which are incorporated herein by reference in its entirety.

TECHNICAL FIELD

The present invention relates to an electric rotating machine preferably used as an electric motor as a driving force for, e.g., various electric vehicles including electric motorcycles, and various electric machines.

BACKGROUND TECHNIQUE

Conventionally, as in Patent Document 1: Japanese Unexamined Laid-open Patent Application Publication No. 2006-191782 which is hereinafter incorporated into the conventional art, as an electric motor used as a driving force for, e.g., various electric vehicles including electric motorcycles and various electric products, a radial gap type electric rotating machine and an axial gap type electric rotating machine are widely known. The radial gap type electrical rotating machine includes a rotor having permanent magnets and configured to rotate about a rotation axis and a cylindrical stator having stator windings and arranged in a radial direction of the rotor via a gap. On the other hand, the axial gap type electrical rotating machine includes a stator having stator windings and a circular disc shaped rotor having permanent magnets and arranged on one end side of the stator in the axial direction of the stator via a gap.

In recent years, a small and high-performance electric motor as a driving force for various electric vehicles including electric motorcycles has been desired. In this type of the electric motor, if the operational range from a high torque low revolution speed range to a low torque high revolution speed range is wide, a driving force required for a vehicle operation can be obtained without using a transmission normally required for a vehicle with an internal combustion engine. When considering mounting such a motor on a vehicle, it is preferable that the size of the electric motor is as small as possible. Therefore, in order to attain a small and high-performance electric motor, it is preferable to arrange as many windings as possible in the limited winding arrangeable region of the stator, and various proposals have been made. According to some proposals, it is said that the space factor of the winding has been improved and therefore a compact electric motor capable of generating a high torque can be provided.

Due to characteristics of an electric motor, however, an electric motor has a problem that although a high torque can be generated in a low revolution speed range, the upper limit of the revolution speed will be limited in a high revolution speed range. That is, in an electric motor, although a high torque can be generated in a low revolution speed range, as the number of revolutions increases, the induced voltage (i.e., back electromotive force), which is to be generated at the stator winding arranged on the stator by a magnetic flux of the permanent magnet provided at the rotor, increases. When the revolution speed increases and reaches a certain speed, the induced voltage induced at the stator winding becomes equal to the applied voltage of the electric motor, preventing the electric current flow in the stator winding. This in turn prevents a further increase of the revolution speed. To solve this problem, it is performed, for example, to decrease the induced voltage (i.e., back electromotive force) by performing a field weakening control.

The field weakening control, however, requires an additional electrical power to negate the induced voltage. Therefore, in the case of a product having an electric motor used in a state in which an electric power is supplied from the outside, the increased power consumption does not result in a shortened drivable time. However, in the case of a product, such as, an electric motorcycle driven by a battery mounted thereon, since the battery capacity is limited, the electric current supplied to negate the induced voltage induced to the stator winding causes increased electric power consumption, resulting in a shortened drivable time. For this reason, it is requested to decrease the power consumption as much as possible.

The inventors proposed a new structure of a stator capable of eliminating the need for a field weakening control which induces additional power consumption. In this proposal, a tooth portion of a stator on which a winding is arranged is divided into at least two divided tooth portions in a relatively movable manner so that the relative movement thereof changes the flow of magnetic flux to decrease the flux linkage of the stator winding at the time of a high revolution speed. According to this proposal, since the flux linkage of the stator winding at the time of a high revolution speed can be adjusted by a physical means, the electrical power conventionally required for the field weakening control can be decreased or eliminated, which enabled to provide an electrical rotating machine capable of decreasing power consumption.

In such an electrical rotating machine having the aforementioned structure, it is desired to further enlarge the operational range from a high torque low revolution speed range to a low torque high revolution speed range.

SUMMARY OF THE INVENTION

Problems to be Solved by the Invention

The present invention was made in view of the aforementioned conventional problems, and aims to provide an electrical rotating machine capable of further enlarging the operational range from a high torque low revolution speed range to a low torque high revolution speed range.

Another aspect of the present invention is to provide a radial gap type electrical rotating machine capable of enlarging the operational range from a high torque low revolution speed range to a low torque high revolution speed range, which can be efficiently controlled even if a strong permanent magnet is used as a permanent magnet for a rotor.

Other objects and advantages of the present invention will be apparent from the following preferred embodiments.

Means for Solving the Problems

The structure of the electrical rotating machine according to the present invention will be explained below. An electric rotating machine according to the present invention includes a rotor having a permanent magnet and configured to rotate about a rotation axis and a stator arranged so as to face the rotor via a gap.

The stator includes a tooth portion arranged so as to face the rotor via the gap, a stator yoke portion forming a stator magnetic path together with the tooth portion, and one or a plurality of windings arranged so as to occupy at least a part of a winding arrangeable region surrounded by the stator yoke portion and the tooth portion, and a magnetic resistance changing mechanism configured to change a magnetic resistance of the stator magnetic path by mechanically changing the stator magnetic path formed by the stator yoke portion and the tooth portion.

The aforementioned magnetic resistance changing mechanism is configured to mechanically change the stator magnetic path between a first state in which the magnetic resistance of the stator magnetic path is small and a second state in which the magnetic resistance of the stator magnetic path is relatively larger than the magnetic resistance of the stator magnetic path in the first state.

The one or a plurality of windings include a current-carrying winding through which an electric current passes in a state in which the stator magnetic path is changed into the second state by the magnetic resistance changing mechanism.

A region of the winding arrangeable region ranging from a stator yoke portion side end of the current-carrying winding to a rotor side end of the winding arrangeable region is divided at an intermediate position of the tooth portion in a radial direction of the rotor into a first region arranged on a rotor side and a second region arranged on a stator yoke portion side. A current-carrying winding space factor defined by a ratio of an actual total winding cross-sectional area of the current-carrying winding existing in the first region to a cross-sectional area of the first region is set to be relatively smaller than a current-carrying winding space factor (current-carrying winding occupied ratio) defined by a ratio of an actual total winding cross-sectional area of the current-carrying winding existing in the second region to a cross-sectional area of the second region.

It is preferable that the aforementioned magnetic resistance changing mechanism includes a plurality of divided tooth portions formed by dividing the tooth portion in a radial direction of the rotor. At least one of the divided tooth portions among the plurality of divided tooth portions constitutes a movable divided tooth portion relatively movable in a circumferential direction of the rotation axis with respect to the other divided tooth portion. The movable divided tooth portion is constituted such that the movable divided tooth portion is movable in the circumferential direction to change the magnetic resistance of the stator magnetic path between the first state and the second state.

It can be configured such that the rotor side end of the current-carrying winding is arranged at a position away from the rotor side end of the winding arrangeable region toward the stator side by a predetermined distance so that no winding is formed in a rotor side region in the winding arrangeable region. In this case, in the second state, there is less magnetic flux which interlinks with the winding, which significantly controls the induced voltage (back electromotive force) induced to the winding. This in turn can increase the upper limit of the revolution speed of the rotor.

In the aforementioned electric rotating machine, a winding fixing member for fixing the winding can be arranged between the rotor side end of the current-carrying winding and the rotor side end of the winding arrangeable region.

In the aforementioned electric rotating machine, it can be configured such that the aforementioned one or a plurality of windings are arranged in such a manner that the entire winding is eccentrically-located toward the stator yoke portion side.

Alternatively, the one or a plurality of windings can be formed so that a number of turns increases in the winding arrangeable region from the rotor side end toward the stator yoke portion side end.

According to another aspect of the present invention, the electric rotating machine includes a rotor having a permanent magnet and configured to rotate about a rotation axis, and a stator arranged so as to face the rotor via a gap. The stator includes a tooth portion arranged so as to face the rotor via the gap. The aforementioned tooth portion is divided into a plurality of divided tooth portions in a direction from a rotor side end portion toward an opposite side end portion thereof. The plurality of divided tooth portions include a first tooth portion arranged so as to face the rotor via the gap and a second tooth portion arranged on the opposite side end portion of the first tooth portion. The stator further includes a stator yoke portion to which the second tooth portion is fixed and one or a plurality of windings arranged in a winding arrangeable region surrounded by the tooth portion and the stator yoke portion so as to occupy at least a part of the winding arrangeable region. At least one of the divided tooth portions among the plurality of divided tooth portions of the tooth portion constitutes a movable divided tooth portion relatively movable with respect to the other divided tooth portion. The aforementioned movable divided tooth portion is movable between a first position in which a magnetic resistance of a magnetic path formed by the divided tooth portions of the tooth portion is small and a second position in which a magnetic resistance of a magnetic path formed by the divided tooth portions of the tooth portion is relatively larger than the magnetic resistance in the first position. The aforementioned one or a plurality of windings include a current-carrying winding through which an electric current passes in a state in which the movable divided tooth portion is arranged in the second position. The region of the winding arrangeable region ranging from a stator yoke portion side end of the current-carrying winding to a rotor side end of the winding arrangeable region is divided at an intermediate position of the tooth portion in a radial direction of the rotor into a first region arranged on a rotor side and a second region arranged on a stator yoke portion side. A current-carrying winding space factor defined by a ratio of an actual total winding cross-sectional area of the current-carrying winding existing in the first region to a cross-sectional area of the first region is set to be relatively smaller than a current-carrying winding space factor defined by a ratio of an actual total winding cross-sectional area of the current-carrying winding existing in the second region to a cross-sectional area of the second region.

In this the electric rotating machine, for example, the rotor side end of the current-carrying winding can be arranged at a position away from the rotor side end of the winding arrangeable region toward the stator side by a predetermined distance, and no winding is formed in a rotor side region in the winding arrangeable region.

Further, a winding fixing member for fixing the winding can be arranged between the rotor side end of the current-carrying winding and the rotor side end of the winding arrangeable region. Further, the aforementioned one or a plurality of windings can be arranged so that the one or a plurality of windings are eccentrically located toward the stator yoke portion side. Alternatively, the aforementioned one or a plurality of windings can be formed so that the number of turns increases in the winding arrangeable region from the rotor side end toward the stator yoke portion side end.

Any of the aforementioned electric rotating machines can be formed as a radial gap type machine in which the rotor includes a columnar rotor main body and a permanent magnet arranged at an outer peripheral edge portion of the rotor main body, and a stator includes a cylindrical first stator portion having a first tooth portion, a cylindrical second stator portion arranged outside of the first stator portion having a second tooth portion and a stator yoke portion, and one or a plurality of windings arranged in the winding arrangeable region formed around the tooth portion so as to occupy at least a part of the winding arrangeable region, and the second stator portion is relatively movable in a circumferential direction of both the stator portions with respect to the first stator portion.

Alternatively, the electric rotating machine can be formed as an axial gap type machine in which a rotor includes a circular disc shaped rotor main body rotatable about a rotation axis and a permanent magnet arranged on one surface of the rotor main body, and a stator is arranged so as to face the rotor main body in an axial direction of the rotation axis.

In the aforementioned radial gap type electric rotating machine, a rotor including a plurality of permanent magnets arranged on one surface of the rotor main body along a circumferential direction at certain intervals in an embedded manner can be used.

In the aforementioned axial gap type electric rotating machine, the rotor including a plurality of permanent magnets arranged on one surface of the rotor main body along a circumferential direction at certain intervals in an outwardly exposed manner can be used.

In the electric rotating machine of either the radial gap type or the axial gap type, a neodymium magnet can be used as the permanent magnet.

In the electric rotating machine of either the radial gap type or the axial gap type, the aforementioned first tooth portion includes a body portion and a pair of side protruded portions extended from circumferential both sides of a rotor side end portion of the body portion in a circumferential direction.

In the aforementioned electrical rotating machine, the flow of the magnetic flux of the permanent magnets of the rotor can be changed by relatively moving the movable divided tooth portion if it is configured such that, in a state in which the movable divided tooth portion is arranged at the first position, a magnetic resistance of a path extending from the rotor side end portion of one of the adjacent pair of tooth portions to the rotor side end portion of the other of the adjacent pair of tooth portions via the stator yoke portion is set to be smaller than a magnetic resistance between a pair of adjacent side protruded portions of the pair of adjacent tooth portions, and in a state in which the movable divided tooth portion is arranged at the second position, the magnetic resistance of the path extending from the rotor side end portion of one of the adjacent pair of tooth portions to the rotor side end portion of the other of the adjacent pair of tooth portions via the stator yoke portion is set to be larger than the magnetic resistance between the pair of adjacent side protruded portions of the pair of adjacent tooth portions.

According to other objects of the present invention, a vehicle equipped with the aforementioned electric rotating machine can be provided.

According to still other objects of the present invention, an electrical product equipped with the aforementioned electrical rotating machine can be provided.

Effects of the Invention

According to the present invention, an electric rotating machine capable of extending the upper limit of the revolution speed in a high revolution speed range and further enlarging the operational range can be provided. Also, an electric rotating machine capable of decreasing or eliminating the electric power for a conventional field weakening control can be provided. Furthermore, even in the case of using a strong permanent magnet, high torque can be obtained in a low revolution speed range, and the upper limit of the revolution speed in the high revolution speed range and the operational range can be enlarged. In addition, it becomes possible to provide an electrical rotating machine that can control the decrease in efficiency by decreasing the occurrence of joule loss generated in the permanent magnet, the decrease in the magnetic coercive force of the permanent magnet caused by the heat generation due to the joule loss, and the decrease in efficiency of the electric motor.

EMBODIMENTS FOR CARRYING OUT THE INVENTION

Figure 10:
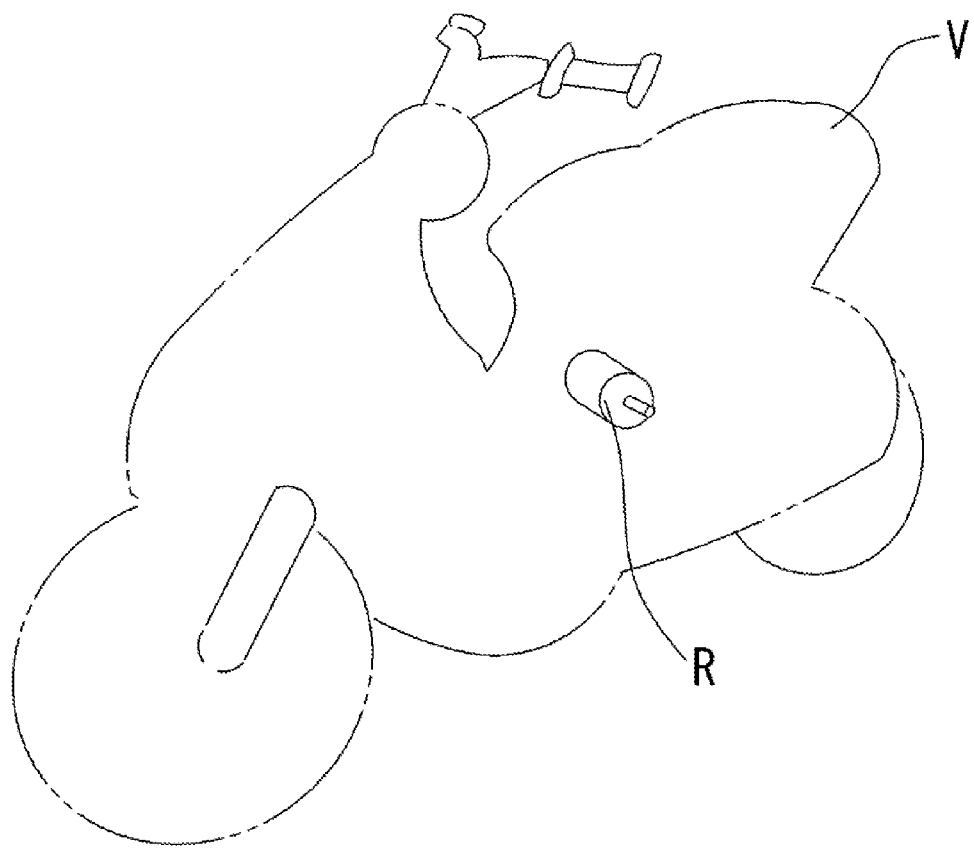
FIG. 10 is a schematic view showing a vehicle equipped with an electrical rotating machine according to the present invention.
Figure 11:
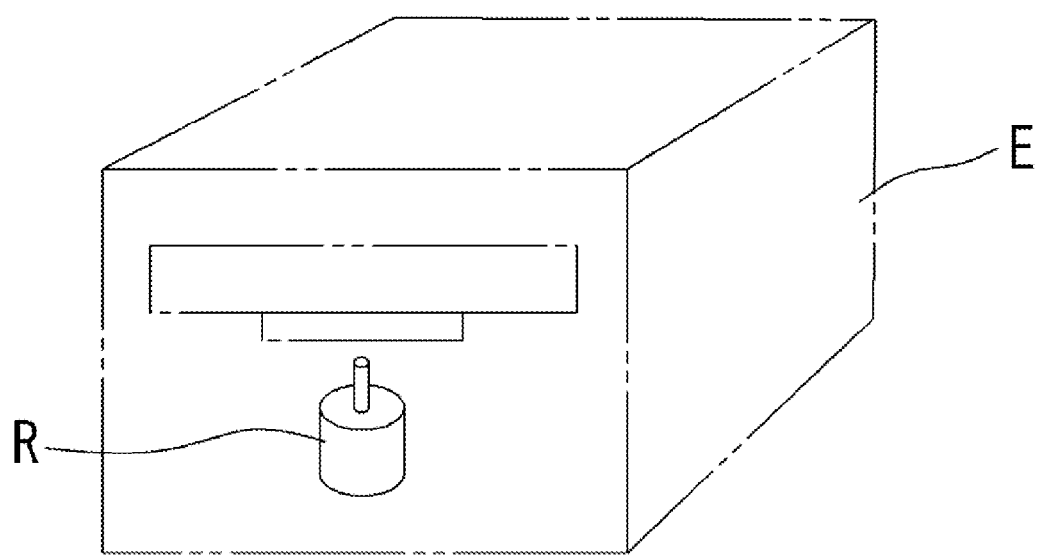
FIG. 11 is a schematic view showing an electrical product equipped with an electrical rotating machine according to the present invention.

Preferred embodiments of the present invention will be explained with reference to the attached drawings. The electric motor as an electric rotating machine R according to the embodiments of the present invention is suitably used for a main driving source or an auxiliary driving source in a variety of vehicles V including, e.g., electric motorcycles and other vehicles requiring a high torque at a low revolution speed and a low torque at a high revolution speed (see FIG. 10). The electric rotating machine according to the present invention is not limited for use in these vehicles, but can be used for, for example, an electric motor as a driving force in electric products E including household electronics, such as, e.g., a washing machine, or an office automation devices, such as, e.g., a DVD player (see FIG. 11).

First Embodiment

Figure 1:
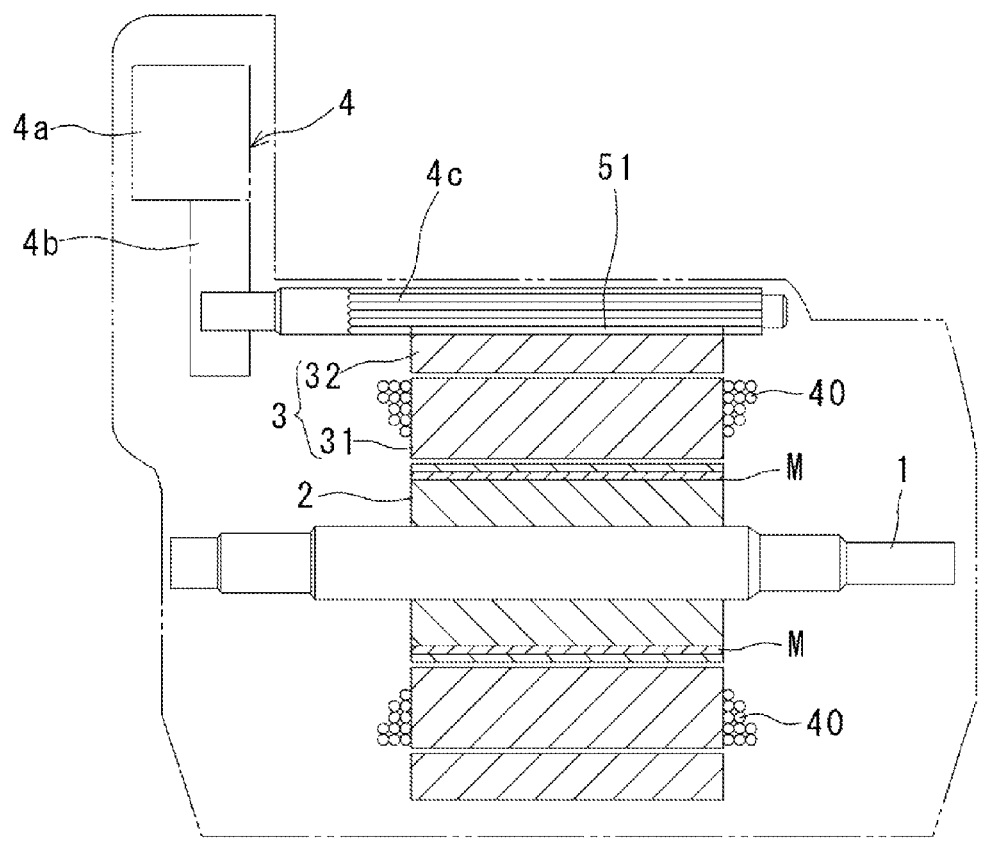
FIG. 1 is a cross-sectional view schematically showing a structure of an electrical rotating machine according to a first embodiment of the present invention.

FIGS. 1 and 5 schematically show a radial gap type motor suitably used as an electric motor for an electric motorcycle according to a first embodiment of the present invention. As shown in these drawings, the radial gap type motor includes a columnar rotor 2 having a plurality of permanent magnets M arranged at an outer peripheral edge portion at certain intervals in a circumferential direction in an embedded manner and configured to rotate about a rotation axis 1, a cylindrical stator 3 arranged so as to face an outer peripheral edge portion of the rotor 2 in the radial direction via a gap, and a rotating mechanism 4 configured to relatively move a movable divided tooth portion constituting the stator 3, which will be explained later.

Figure 2:
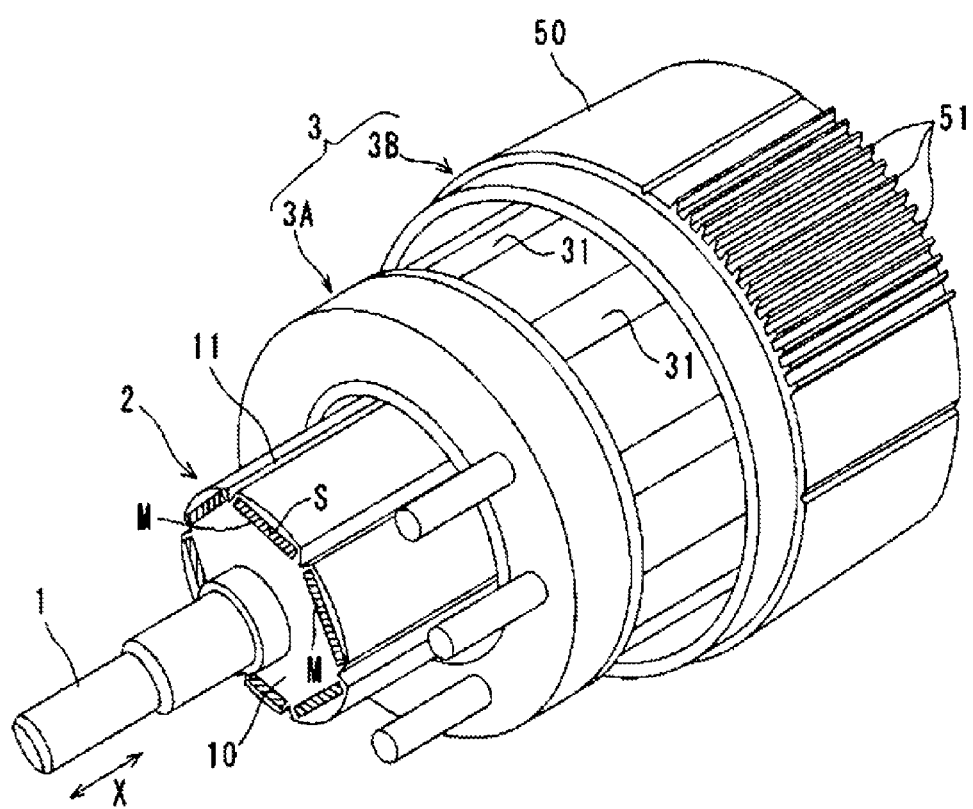
FIG. 2 is a perspective view showing main structural members of the electric rotating machine in a sequentially pulled out manner in the axial direction.

As shown in FIG. 2, the rotor 2 includes a cylindrical rotor main body 10 having the rotation axis 1 at the axial center. A plurality (six in this embodiment) of plate shaped permanent magnet pieces M each having a rectangular cross-section are arranged in the circumferential direction of the rotor 2 in an embedded manner at constant intervals in the outer peripheral edge portion of the rotor main body 10.

In the permanent magnet piece M, for example, neodymium magnets can be used. In the case of using a strong permanent magnet, in a conventional electrical motor, a high torque can be generated, but a large induced voltage (back electromotive force) will be induced in the stator winding at the time of a high revolution speed range, which lowers the maximum revolution speed. However, in the electrical rotating machine according to the present invention, such problem can be solved by the winding arrangement structure which will be explained.

The present invention is not limited to the case using such strong permanent magnets, and allows the use of conventionally available permanent magnets having a normal magnetic force. Further, the materials, characteristics, measurements, and number of permanent magnets are not specifically limited in the present invention.

The permanent magnet piece M is formed into a plate shape having a rectangular cross-sectional shape extending along the axial direction X, and embedded in and fixed to a slit S having a corresponding cross-sectional shape and formed in the outer peripheral edge portion of the rotor main body 10 at a position radially inward of the outer circumferential surface by a predetermined distance. Therefore, even if the rotor main body 10 rotates at a high revolution speed about the rotation axis 1, the permanent magnet piece M does not break loose to the outside in the radial direction due to the centrifugal force since the permanent magnet piece M is fixedly fitted in the slit S.

The rotor main body 10 is formed by, for example, bonding a plurality of thin silicon steel plates, each formed into a predetermined shape by punching process, in the axial direction X, so that possible eddy-current loss to be generated due to changes in magnetic flux in the rotor main body 10 can be reduced.

In the embodiment, as described above, the aforementioned permanent magnet pieces M are arranged in the outer peripheral edge portion of the rotor main body 10 in an embedded manner, and the plurality of permanent magnet pieces M are arranged in the circumferential direction, but the present invention is not limited to the above. For example, a plurality of permanent magnet pieces M can be arranged on the outer circumferential surface of the rotor main body 10, and fixed with, for example, a cylindrical support member so that the permanent magnet pieces do not break loose to the outside in the radial direction by the centrifugal force caused by the rotation of the rotor main body 10. Further, in place of the plurality of separated and independent permanent magnet pieces, an integral permanent magnet integrally formed into a cylindrical shape and magnetized can be used.

Figure 3:
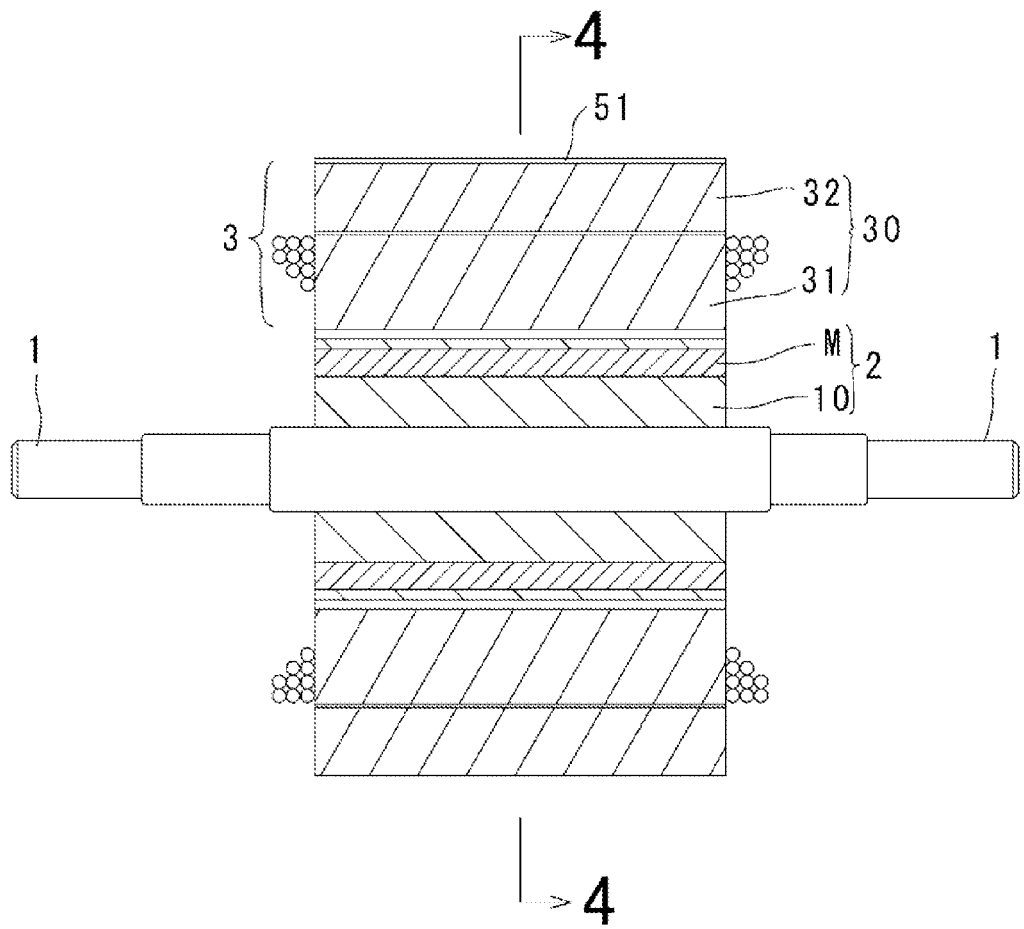
FIG. 3 is a cross-sectional view showing the rotor and the stator of the electric rotating machine.

The stator 3 is arranged coaxially with the rotor 2 via a predetermined gap and arranged radially outward of the rotor 2 so as to face the aforementioned rotor 2. As shown in FIGS. 2 and 3, the stator 3 includes a cylindrical first stator portion 3A coaxially arranged with the rotor main body 10 via a predetermined gap and arranged outward of the outer peripheral surface of the rotor main body 10, and a cylindrical second stator portion 3B coaxially arranged with the rotor 2 via a predetermined gap and arranged radially outward of the first stator portion 3A in a state in which the second stator portion 3B can be movable in the circumferential direction relative to the first stator portion 3A.

Figure 4A:
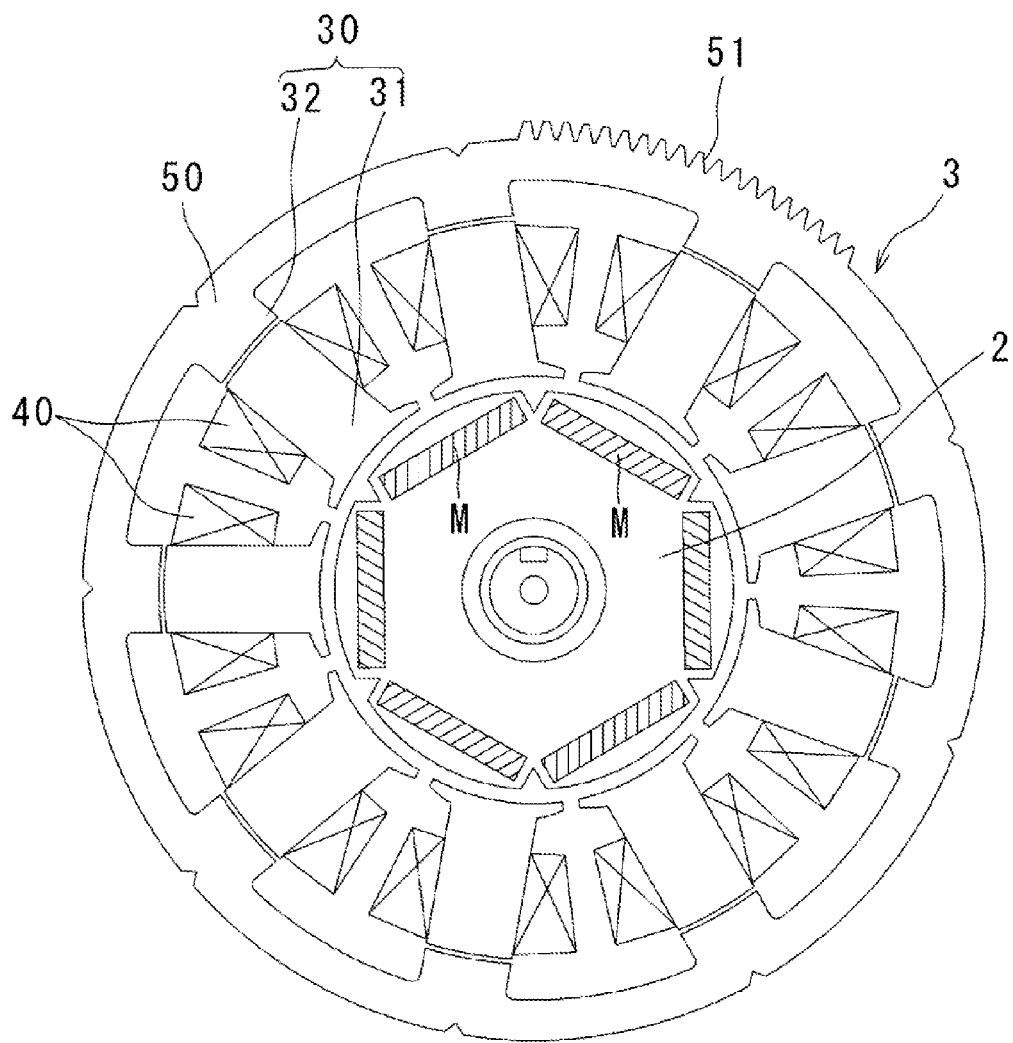
FIG. 4A is a cross-sectional view taken along the line 4-4 in FIG. 3 and showing a state in which the second tooth portion is in the first position in which the first tooth portion and the second tooth portion are arranged in a radially aligned manner.

The stator 3 includes, as shown in FIG. 4A, a plurality of tooth portions 30 arranged at predetermined intervals along the circumferential direction of the rotor 2 with the gap formed radially outward of the rotor 2. Each tooth portion 30 is divided, at a portion closer to an end portion opposite to a rotor side end portion, into two divided tooth portions in the radial direction, i.e., a first tooth portion 31 arranged closer to the rotor side and a second tooth portion 32 arranged outward of the first tooth portion 31.

The first tooth portion 31 and the second tooth portion 32 are arranged via a predetermined gap so that both the tooth portions can be relatively movable. The gap between the first tooth portion 31 and the second tooth portion 32 is set to be smaller than the gap between the rotor side end edge of the first tooth portion 31 and the outer peripheral surface of the rotor 2. That is, in a state in which the first tooth portion 31 and the second tooth portion 32 are arranged in the radially aligned manner, the magnetic resistance Rk (Rk1) between the first tooth portion 31 and the second tooth portion 32 is smaller than the magnetic resistant Rh between the rotor side end edge of the first tooth portion 31 and the outer peripheral edge of the rotor 2 (see FIG. 5A).

Each of the first tooth portion 31 is formed so that the end edge of the rotor side end portion of the body portion is formed into a circular arc shape corresponding to the outer circumferential shape of the rotor 2, and is integrally provided with side protruded portions 31a and 31a extending in the circumferential direction on both circumferential side portions of the rotor side end portion of the body portion.

The gap between the side protruded portions 31a and 31a of adjacent first tooth portions 31 and 31 is set to be larger than the gap between the first tooth portion 31 and the second tooth portion 32. Specifically, the gap between the side protruded portions 31a and 31a is set so that the magnetic resistance Rj between the side protruded portions 31a and 31a of the adjacent first tooth portions 31 and 31 is larger than 2 times the magnetic resistance 2Rk (2Rk1) between the first tooth portion 31 and the second tooth portion 32 in a state in which the first tooth portion 31 and the second tooth portion 32 are arranged in the radially aligned manner (see FIG. 5A).

Each first tooth portion 31 is provided with a winding 40. As shown in FIG. 2, a plurality of first tooth portions 31 with these windings 40 constitute the cylindrical first stator portion 3A with resin mold. The winding 40 can be a single winding or a plurality of separate and independent windings. In this embodiment, a single winding is employed. The arrangement structure of the winding 40 will be explained later.

The second tooth portion 32 is, as shown in FIG. 4A, formed integral with the stator yoke portion 50 in a manner such that the second tooth portion 32 is inwardly protruded from the inner circumferential surface of the cylindrical stator yoke portion 50, and arranged corresponding to the first tooth portion 31. In this embodiment, the second tooth portion 32 is an integral structure with the stator yoke portion 50, but it can be configured such that the second tooth portion 32 is formed separately from the stator yoke portion 50 and connected and fixed to the stator yoke portion 50. As shown in FIG. 2, the second tooth portion 32 and the stator yoke portion 50 constitute the cylindrical second stator portion 3B.

On the outer peripheral surface of the stator yoke portion 50 constituting the second stator portion 3B, as shown in FIG. 2, on a part of the circumferential region, a gear portion 51 having a plurality of teeth is formed along the entire length in the longitudinal direction of the stator yoke portion 50. As shown in FIG. 1, the gear portion 51 is engaged with a wheel gear 4c which is rotary driven by a drive motor 4a of the rotating mechanism 4 via the speed reduction mechanism 4b.

The drive motor 4a is structured to rotate in both opposite directions by a controller not shown in the drawing, and the rotational force of the drive motor 4a is transmitted to the wheel gear 4c via the speed reduction mechanism 4b. The rotation of the wheel gear 4c is transmitted to the gear portion 51 of the stator yoke portion 50 (second stator portion 3B), and the second stator portion 3B is relatively moved in the circumferential direction with respect to the first stator portion 3A, and the second tooth portion 32 can be freely and relatively moved in a certain range in the circumferential direction of the first tooth portion 31. In this way, by controlling the drive motor 4a, the relative positions of the first tooth portion 31 and the second tooth portion 32 can be arbitrarily and continuously or discontinuously changed.

Figure 4B:
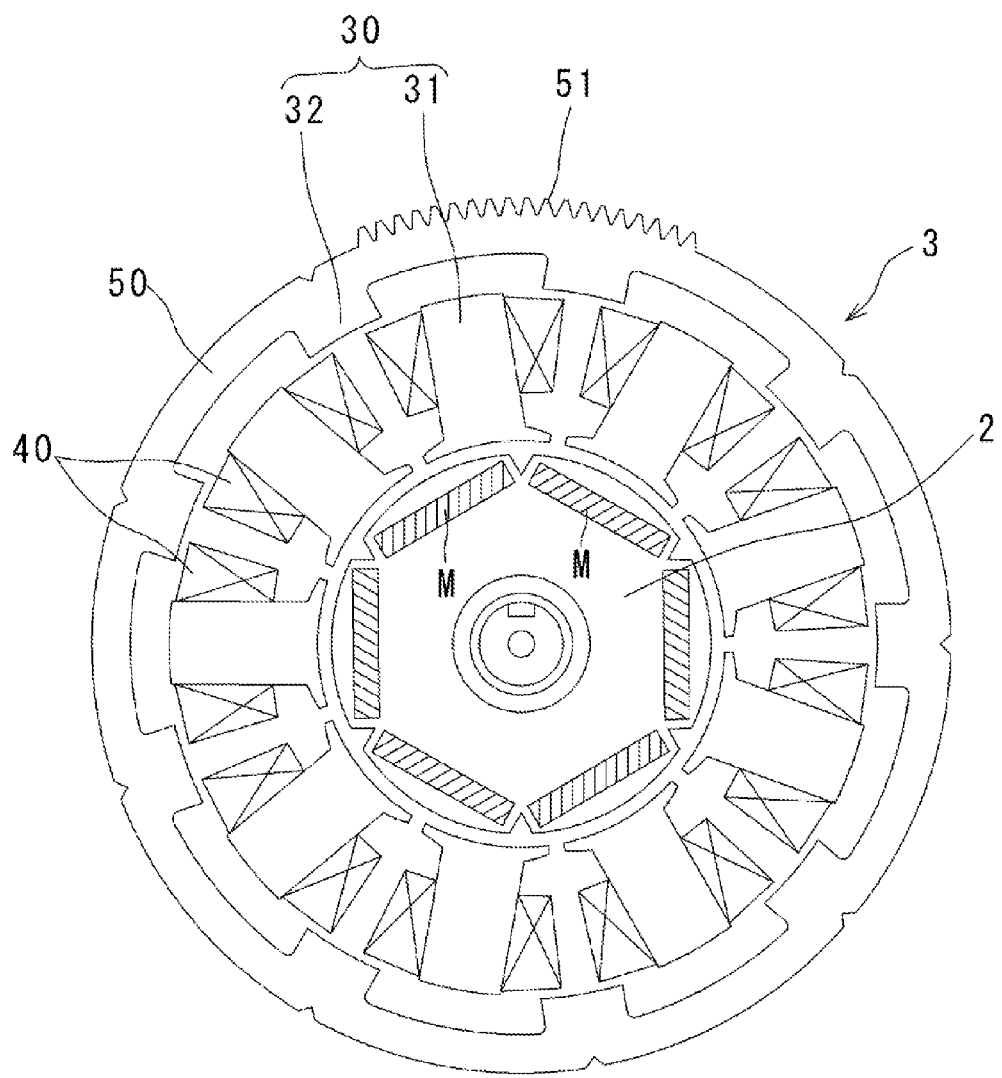
FIG. 4B is a cross-sectional view corresponding to FIG. 4A, showing a state in which the second tooth portion is in the second position in which the second tooth portion is relatively moved with respect to the first tooth portion.
Figure 5A:
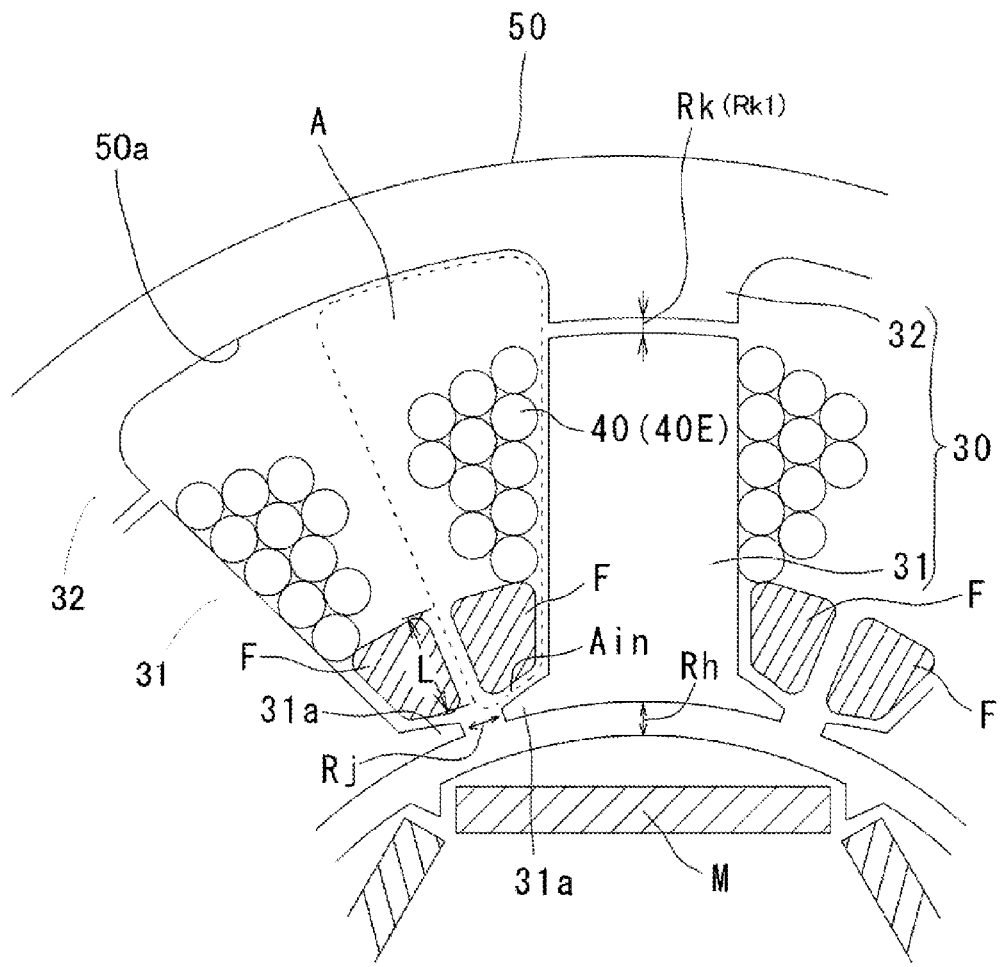
FIG. 5A is a partially enlarged cross-sectional view showing the tooth portion on which a winding is arranged and the vicinity thereof in the first state as shown in FIG. 4A.
Figure 5B:
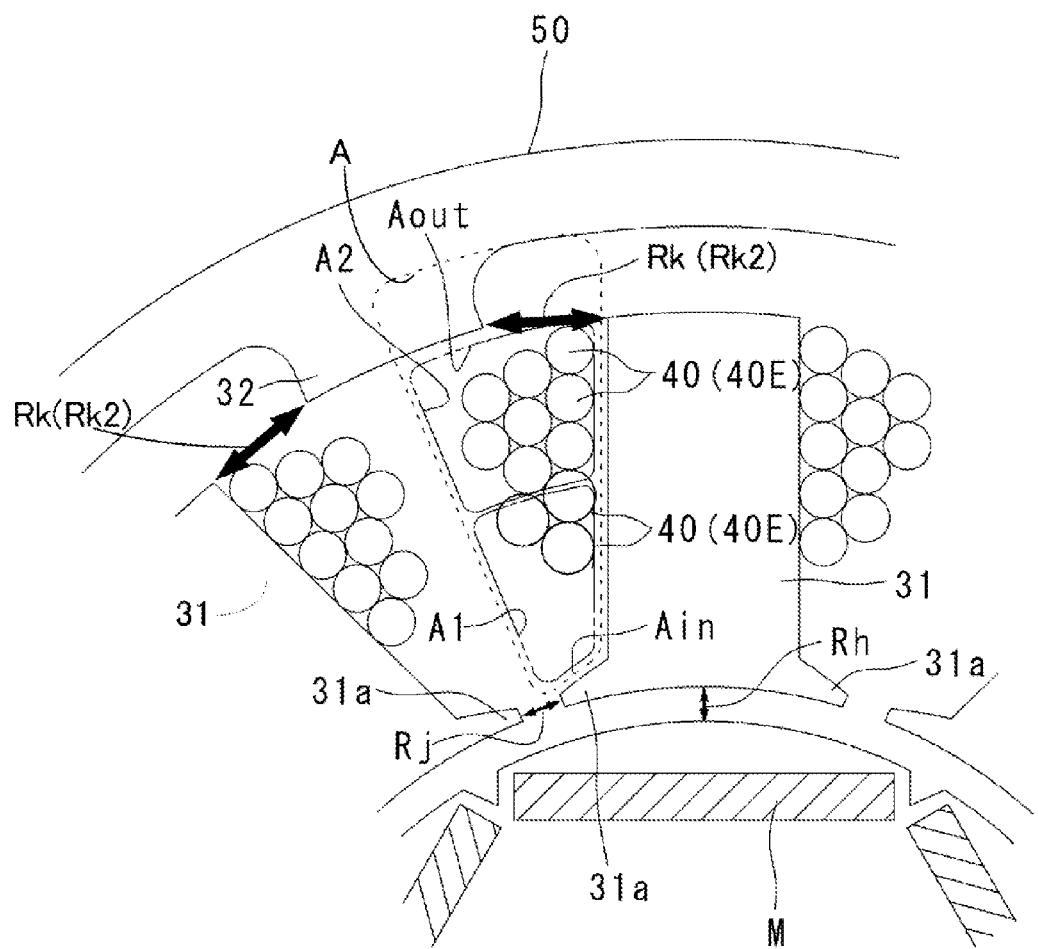
FIG. 5B is a partially enlarged cross-sectional view showing the tooth portion on which a winding is arranged and the vicinity thereof in the second state as shown in FIG. 4B.

By controlling the drive motor 4a, the relative position of the second tooth portion 32 as a movable divided tooth portion with respect to the first tooth portion 31 can be freely changed continuously or discontinuously between a magnetic resistance minimum position in which, as shown in FIGS. 4A and 5A, the magnetic resistance Rk1 of the magnetic path formed by the first tooth portion 31 and the second tooth portion 32 arranged in a radially aligned manner is minimum and a magnetic resistance maximum position in which, as shown in FIGS. 4B and 5B, the second tooth portion 32 is positioned in between a pair of adjacent first tooth portions 31 and 31 and the magnetic resistance Rk2 of the magnetic path formed by the first tooth portion 31 and the second tooth portion 32 is maximum.

When the magnetic resistance minimum position as shown in FIGS. 4A and 5A is defined as a first position and the magnetic resistance maximum position as shown in FIGS. 4B and 5B is defined as a second position, the movable divided tooth portion (the second tooth portion 32) is controlled so that the movable divided tooth portion moves between the first position and the second position.

In the present invention, it is not required that the first position and the second position exactly correspond to the magnetic resistance minimum position and the magnetic resistance maximum position, respectively. For example, in the present invention, it can be configured such that two arbitrary positions between the magnetic resistance minimum position and the magnetic resistance maximum position are defined as the first position and the second position, respectively, and that the movable divided tooth portion (second tooth portion) 32 is moved between the first position and the second position. Furthermore, in the present invention, when a state in which the magnetic resistance of the stator magnetic path formed by the stator yoke portion 50 and the tooth portion 30 is small is defined as a first state, and a state in which the magnetic resistance of the stator magnetic path is relatively larger than the first state is defined as a second state, the present invention includes a case in which the stator magnetic path is mechanically changed so that the magnetic resistance of the stator magnetic path is changed between the first state and the second state. The following explanation is made using the aforementioned languages, i.e., the first position and the second position, but it should be understood that the same effects can be attained when these languages are replaced with the first state and the second state.

In this embodiment, a tooth portion 30 which is divided into two portions in the radial direction is exemplified, but the tooth portion is not limited to that. In the present invention, the tooth portion 30 can be divided into, for example, three or more portions in the radial direction. When the tooth portion 30 is divided into three or more portions, the divided tooth portion arranged closest to the rotor 2 is defined as the first tooth portion 31, and the divided tooth portion arranged at the outermost opposite side is defined as the second tooth portion 32. In cases where the tooth portion is divided into three or more divided tooth portions, it can be configured such that at least one of the plurality of divided tooth portions constitutes a movable divided tooth portion relatively movable with respect to the other divided tooth portions, and the magnetic resistance of the magnetic path formed by the divided tooth portions is adjustable by the relative movement of the movable divided tooth portion.

In this embodiment, the following explanation is made such that each tooth portion is divided into a first tooth portion 31 and a second tooth portion 32, but the structure can be understood as follows. That is, it can be understood such that the first tooth portion 31 constitutes a tooth portion; the second tooth portion 32 and the stator yoke portion 50 constitutes a stator yoke portion; a concave portion 50a (see FIG. 5A) is formed on the inner circumferential surface of the stator yoke portion 50; and the stator yoke portion is relatively movable with respect to the tooth portion (first tooth portion 31) in the circumferential direction. When it is understood that the tooth portion 30 has a structure in which the tooth portion 30 is not divided in the radial direction, it can be understood such that the stator 3 is provided with a magnetic resistance changing mechanism in which the magnetic resistance value of the stator magnetic path changes when the stator magnetic path formed by the stator yoke portion 50 and the tooth portion 30 is mechanically changed. The aforementioned magnetic resistance changing mechanism is not limited to a type as shown in the embodiment in which tooth portions are divided, but can have any other structure as long as the stator magnetic path formed by a stator yoke portion 50 and a tooth portion 30 is mechanically changed so that the magnetic resistance value of the stator magnetic path can be changed. For example, one example of a modified magnetic resistance changing mechanism includes a mechanism in which without dividing each tooth portion, the stator yoke portion 50 is divided in the circumferential direction to form a magnetic gap at a part of the stator yoke portion 50 so that the magnetic gap can be adjustable.

In the meantime, in the field of electrical rotating machines of this type, in an electric motor, for the purpose of improving the performance while reducing the size, various proposals for arranging as many windings as possible on the stator have been conventionally made. For example, it has been proposed to improve the space factor of the winding per unit area by changing the way of the winding on the stator or the shape of the winding itself. In other words, conventional proposals were only directed to how to arrange as many windings as possible in a limited winding arrangeable region.

In summary, in conventional proposals, it has been attempted to increase the torque while preventing the enlargement of the motor itself by arranging as many windings as possible in a limited winding arrangeable region.

However, as a result of keen experiments and researches, the present inventors found the fact that the aforementioned object to improve the torque while preventing the enlargement of the motor itself can be achieved by the aforementioned attempt, but it is difficult to achieve further increase of the operational range from the high torque low revolution speed range to the low torque high revolution speed range. Based on the aforementioned findings and recognition that another attempts are needed, the inventors completed the present invention. In other words, the inventors changed their point of view from the conventional point of view, and proposed a new idea which is completely opposite to a conventional idea of increasing the space factor of the winding. That is, the inventors dare to employ a method of "decreasing the space factor of the winding" which was never considered by conventional motor development engineers since the method results in a reduction in torque and an increase in size of the motor.

Furthermore, as shown in the electrical rotating machine according to the embodiment, in the structure in which the tooth portion is divided into a plurality of tooth portions and any one of the divided tooth portions is relatively movable with respect to the other divided tooth portion, the inventors employed a method of changing the balance of the "space factor of the winding (occupied ratio of the winding)." Further, it was configured to increase the difference between the magnetic flux of permanent magnets of the rotor that interlinks the stator winding when the magnetic resistance of the magnetic path formed by a plurality of tooth portions is large and the magnetic flux of permanent magnets of the rotor that interlinks the stator winding when the magnetic resistance of the magnetic path is small. In this way, the operational range from the high torque low revolution speed range to the low torque high revolution speed range could be increased. Specific explanation will be made below.

In this embodiment, as described above, the tooth portion 30 is provided with a winding 40 arranged on the periphery of the tooth portion 30. A region shown by the dashed line in FIG. 5A is defined as a winding arrangeable region A in which a winding can be actually arranged, wherein the winding arrangeable region A is one of regions obtained by equally dividing a region surrounded by the pair of adjacent tooth portions 30 and 30 and the stator yoke portion 50 at the circumferential intermediate position of the pair of adjacent tooth portions 30 and 30.

In the motor according to this embodiment, as shown in FIGS. 5A and 5B, the winding 40 is arranged only in a part of the winding arrangeable region A. In detail, the winding 40 is arranged in a region in the winding arrangeable region A defined by and between a position shifted from the rotor side end portion Ain of the winding arrangeable region A toward the stator side by a certain distance L and the radially outermost end portion of the first tooth portion 31.

As shown in FIG. 5A, the winding 40 constitutes a current-carrying winding 40E that an electric current passes through the entire portion of the winding 40 to generate a magnetic field at the first position in which the first tooth portion 31 and the second tooth portion 32 are arranged in the radially aligned manner. On the other hand, as shown in FIG. 5B, the winding 40 also constitutes a current-carrying winding 40E that a current passes through the entire portion of the winding 40 to generate a magnetic field even at the second position in which the second tooth portion 32 as a movable divided tooth portion is moved in the circumferential direction and arranged between the pair of adjacent first tooth portions 31 and 31. Therefore, in this embodiment, the current-carrying winding 40E at the first position and the current-carrying winding 40E at the second position are the same.

FIG. 5B shows a state in which the movable divided tooth portion 32 is in the second position in which the movable divided tooth portion 32 is relatively moved with respect to the other divided tooth portion 31 so that the magnetic resistance Rk (Rk2) of the magnetic path formed by the divided tooth portions 31 and 32 is large. In this second position state, the region from the stator yoke portion side end (i.e., the outside end) Aout of the current-carrying winding 40 E (all windings in this embodiment) in the winding arrangeable region A to the rotor side end Ain (i.e, the inside end) of the winding arrangeable region A is divided, at the intermediate position in the direction that the divided tooth portions 31 and 32 of the tooth portions 30 are arranged, into a first region A1 arranged on the rotor side and a second region A2 arranged on the stator yoke portion side as shown by the two-dashed line.

The "intermediate position" in the present invention does not only mean a geometrically and strictly equally divided position, and means an arbitrary intermediate position having a certain range in a radially intermediate region. For example, using this embodiment as an example, in this embodiment, the intermediate position is defined as a position where the distance between the radially outermost end side Aout of the first divided tooth portion 31 (i.e., the stator yoke portion side end of the first divided tooth portion 31) and the innermost rotor side end Ain of the winding arrangeable region A is equally divided. However, in the present invention, other than the strictly and equally divided position as mentioned above, the "intermediate position" can be defined as an arbitrary position in the radial direction of the intermediate region having a certain width between the stator yoke portion side end Aout and the innermost rotor side end Ain. In other words, the "intermediate position" in the present invention is not only a geometrically strict intermediate position, but should be understood to include an approximate intermediate position having a general meaning, including a position having a certain width around the geometrically strict intermediate position. This interpretation should also be applied to the following other embodiments.

The current-carrying winding space factor $(S_{40E}/S_{A1})$ defined as the ratio of the actual total winding cross-sectional area $S_{40E}$ of the current-carrying winding 40E arranged in the first region A1 to the cross-sectional area $S_{A1}$ of the first region A1 is set to be relatively smaller than the current-carrying winding space factor $(S_{40E}/S_{A2})$ defined as the ratio of the actual total winding cross-sectional area S40E of the current-carrying winding 40E arranged in the second region A2 to the cross-sectional area $S_{A2}$ of the second region A2.

In the present invention, the reasons for setting the current-carrying winding space factor as described above is as follows. As shown in FIGS. 4A and 5A, in a state in which the second tooth portion 32 as the movable divided tooth portion is in the first position in which the first tooth portion 31 and the second tooth portion 32 are arranged in a radial aligned manner, when the rotor 2 is rotating at a low revolution speed, an induced voltage (back electromotive force) is generated in the winding 40 by the magnetic flux of the permanent magnet pieces M at the time of rotation. When the revolution speed is slow, the induced voltage is relatively small as compared with the applied voltage of the winding 40, and therefore the revolution speed can further be increased.

However, as the revolution speed of the rotor 2 increases, the induced voltage generated in the winding 40 gradually increases by the rotating magnetic flux of the permanent magnet pieces M. When the revolution speed reaches a certain revolution speed, the voltage applied to the winding 40 and the induced voltage generated in the winding 40 become equal, and therefore the revolution speed reaches the upper limit. In this case, of course, the upper limit of the revolution speed can be increased by increasing the voltage applied to the winding 40. However, it is not advisable since the power consumption significantly increases.

As a method for increasing the revolution speed by solving the weak point of the rotational characteristics of a motor, i.e., a method of changing from a high torque low revolution to a low torque high revolution, a filed weakening control method is known. As a method capable of replacing or supporting a conventional field weakening control method, as explained above, the inventors proposed a method of controlling the induced voltage by changing the flow of the magnetic flux with a mechanical structure to decrease the flux linkage of the stator winding of the magnetic flux of the permanent magnets at the time of a high revolution speed.

That is, the inventors proposed to divide the tooth portion of the stator into at least two divided portions so that the divided tooth portions can be relatively moved to change the flow of the magnetic flux to thereby decrease the flux linkage of the stator winding by the magnetic flux of the permanent magnets at the time of a high revolution speed. However, in cases where a stronger permanent magnet was used, although it was possible to increase the torque, a new problem arose that the upper limit of the revolution speed is decreased, which prevents a further increase of the operational range.

To solve this new problem, in the present invention, as explained above, the arrangement structure of the winding 40 is devised. That is, the current-carrying winding space factor defined as the ratio of the actual total winding cross-sectional area $S_{40E}$ of the current-carrying winding 40E in each region A1 and A2 to the cross-sectional area of the first region A1 and the second region A2 is set so that the space factor in the first region A1 is relatively smaller than the space factor in the second region A2.

As shown in FIG. 5A, in the first position state in which the first tooth portion 31 and the second tooth portion 32 are arranged in a radially aligned manner, the magnetic resistance Rk (Rk1) of the gap between the first tooth portion 31 and the second tooth portion 32 is relatively significantly smaller than the magnetic resistance Rj between the side protruded portions 31a and 31a formed on the rotor side end portion of the adjacent first tooth portions 31 and 31 (i.e., 2Rk (2Rk1)<Rj). Therefore, the total magnetic resistance 2Rk (2Rk1) of the magnetic path extending from one of the pair of adjacent tooth portions 30 and 30 to the other of the pair of adjacent tooth portions 30 and 30 via the stator yoke portion 50 is smaller than the magnetic resistance Rj between the side protruded portions 31a and 31a formed on the rotor side end portions of the adjacent first tooth portions 31 and 31. For this reason, most of the magnetic flux from the permanent magnet piece M of the rotor 2 passes through the magnetic path extending from one of the a pair of adjacent tooth portions 30 and 30 to the other of the pair of adjacent tooth portions 30 and 30 via the stator yoke portion 50.

On the other hand, as shown in FIG. 5B, in the second position state in which the second tooth portion 32 as a movable divided tooth portion is moved with respect to the first tooth portion 31, the magnetic resistance Rk (Rk2) between the first tooth portion 31 and the second tooth portion 32 becomes relatively larger than the magnetic resistance Rj between the side protruded portions 31a and 31a formed on the rotor side end portions of the adjacent first tooth portions 31 and 31 (Rj<2×Rk (2×Rk2). It should be noted that it is not required that the adjacent magnetic resistances Rk (Rk2) in the circumferential direction are the same. Therefore, the total magnetic resistance 2Rk (2Rk2) of the magnetic path extending from the first tooth portion 31 of one of the pair of adjacent tooth portions 30 and 30 to the first tooth portion 31 of the other of the pair of adjacent tooth portions 30 and 30 via the second tooth portion 32 arranged between the adjacent first tooth portions 31 and 31 is larger than the magnetic resistance Rj between the side protruded portions 31a and 31a of the adjacent first tooth portions 31 and 31. Therefore, the magnetic flux from the permanent magnet pieces M of the rotor 2 passes through the magnetic path extending from the rotor side end portion of one of the adjacent first tooth portions 31 and 31, the side protruded portion 31a of the one of the adjacent first tooth portions 31 and 31, the side protruded portion 31a of the other of the adjacent first tooth portions 31 and 31, and the rotor side end portion of the other of the adjacent first tooth portions 31 and 31.

In this way, by moving the second tooth portion 32 as a movable divided tooth portion relatively to the first tooth portion 31, the main magnetic flux flow can be changed.

As shown in FIG. 5A, in the first position state in which the first tooth portion 31 and the second tooth portion 32 are arranged in a radially aligned manner, as described above, the majority of the magnet flux from the permanent magnet piece M of the rotor 2 passes through a magnetic path extending from one of the pair of adjacent tooth portions 30 and 30 to the other of the pair of adjacent tooth portions 30 and 30 via the stator yoke portion 50. Therefore, when the revolution speed of the rotor 2 increases in this first position state, since the majority of the magnetic flux of the permanent magnet piece M cuts across the winding 40 to generate a large induced voltage on the winding 40. Therefore, in this first position state, the rotor 2 cannot be rotated at a high revolution speed exceeding a certain revolution speed.

To the contrary, as shown in FIG. 5B, in the second position state in which the second tooth portion 32 is relatively moved with respect to the first tooth portion 31, the magnetic flux from one of magnetic poles of one of the permanent magnets M and M passes through a magnetic circuit having a main path extending from a rotor side end portion of one of the adjacent first tooth portions 31 and 31 to a rotor side end portion of the other of the adjacent first tooth portions 31 and 31 via a side protruded portion 31a of the rotor side end portion of one of the adjacent first tooth portions 31 and 31, and a side protruded portion 31a of a rotor side end portion of the other of the adjacent first tooth portions 31 and 31. In this way, since the majority of the magnetic flux of the permanent magnet M passes through the magnetic resistance Rj between the side protruded portions 31a and 31a of the adjacent first tooth portions 31 and 31, the flux linkage of the winding 40 decreases, which in turn significantly reduces the induced voltage of the winding 40. Therefore, the upper limit of the revolution speed of the rotor 2 can be increased.

In the meantime, the inventor found the fact that, in the second position state in which the second tooth portion 32 is moved with respect to the first tooth portion 31, not all of the magnetic flux of the permanent magnet M passes through the magnetic resistance Rj between the side protruded portions 31a and 31a of the adjacent first tooth portions 31 and 31, but some of the magnetic flux passes through a portion other than the portion between the rotor side end portions of the adjacent first tooth portions 31 and 31, i.e., a portion between the adjacent tooth portions 30 and 30, as a magnetic flux leakage, and that the induced voltage generated in the winding 40 by this magnetic flux leakage prevents the increase in the upper limit revolution speed of the rotor 2. Conventionally, as described above, it was considered to be preferable to arrange as many windings as possible in the winding arrangeable region A surrounding the tooth portion 30 from a rotor side end portion thereof to an opposite side end portion thereof, to increase the winding space factor.

However, the inventors found the fact that the influence of the magnetic flux leakage that interlinks with the winding 40 especially wound on the rotor side end portion of the tooth portion in the winding arrangeable region A cannot be ignored, and devised the winding arrangement. Especially in the case of using a magnet, such as, e.g., a neodymium magnet, that generates a strong magnetic force, the magnetic flux leakage which interlinked with the winding wound around the rotor side end portion of the tooth portion increases, and therefore its influence becomes larger. Therefore, especially in such a case, the present invention can exert significant effects.

As a specific method for setting the current-carrying winding space factor as defined above to be relatively smaller in the first region A1 than in the second region A2, for example, as shown in FIGS. 4 and 5, a method can be exemplified in which the winding 40 is formed in a state in which it is shifted to the stator yoke portion side relative to the tooth portion 30 so that no winding is formed in a predetermined region of the rotor side end portion. In this case, a winding fixing member F can be arranged on a portion where no winding is formed (see FIG. 5A). Furthermore, the first tooth portion 31 including the winding 40 can be formed into a cylindrical shape with resin mold.

As described above, in the second position state in which the second tooth portion 32 is relative moved with respect to the first tooth portion 31, the magnetic flux leakage between the adjacent first tooth portions 31 and 31 is larger in the rotor side end portion than in the stator yoke portion side end. Therefore, by arranging the winding 40 so that the current-carrying winding space factor is relatively smaller in the first region A1 than in the second region A2, the induced voltage (back electromotive force) induced by the current-carrying winding 40E existing in the first region A1 can be controlled. Therefore, by controlling the relative position of the second tooth portion 32 with respect to the first tooth portion 31, the amount of the induced voltage (back electromotive force) induced to the winding 40 can be controlled, which in turn can increase the maximum revolution speed of the rotor 2 determined by the amount of the induced voltage (back electromotive force).

As explained above, since the operational range can be enlarged by increasing the maximum revolution speed by controlling the position of the second tooth portion 32 with respect to the first tooth portion 31, there is no need to supply electricity required for back electromotive force control as in the case of weak magnetic field control. Therefore, the power consumption of the whole motor can be controlled.

In the present invention, the positional control of the second tooth portion 32 with respect to the first tooth portion 31 is not limited to the case in which the first position as shown in FIG. 5A in which the first tooth portion 31 and the second tooth portion 32 are arranged in a radially aligned manner and the second position as shown in FIG. 5B in which the second tooth portion 32 is relatively moved with respect to the first tooth portion 31 are controlled to be alternatively switched. In other words, the present invention includes a case in which the second tooth portion 32 is controlled to continuously or discontinuously be moved relative to the first tooth portion 31 between the first position and the second position. By the continuous or discontinuous control, the motor can provide performance in the most efficient state depending on the revolution speed.

In this embodiment, the explanation was directed to a case in which only the positional control of the second tooth portion 32 with respect to the first tooth portion 31 was executed. However, the present invention allows the combined use of the aforementioned positional control and the conventional filed weakening control.

Second Embodiment

Figure 6A:
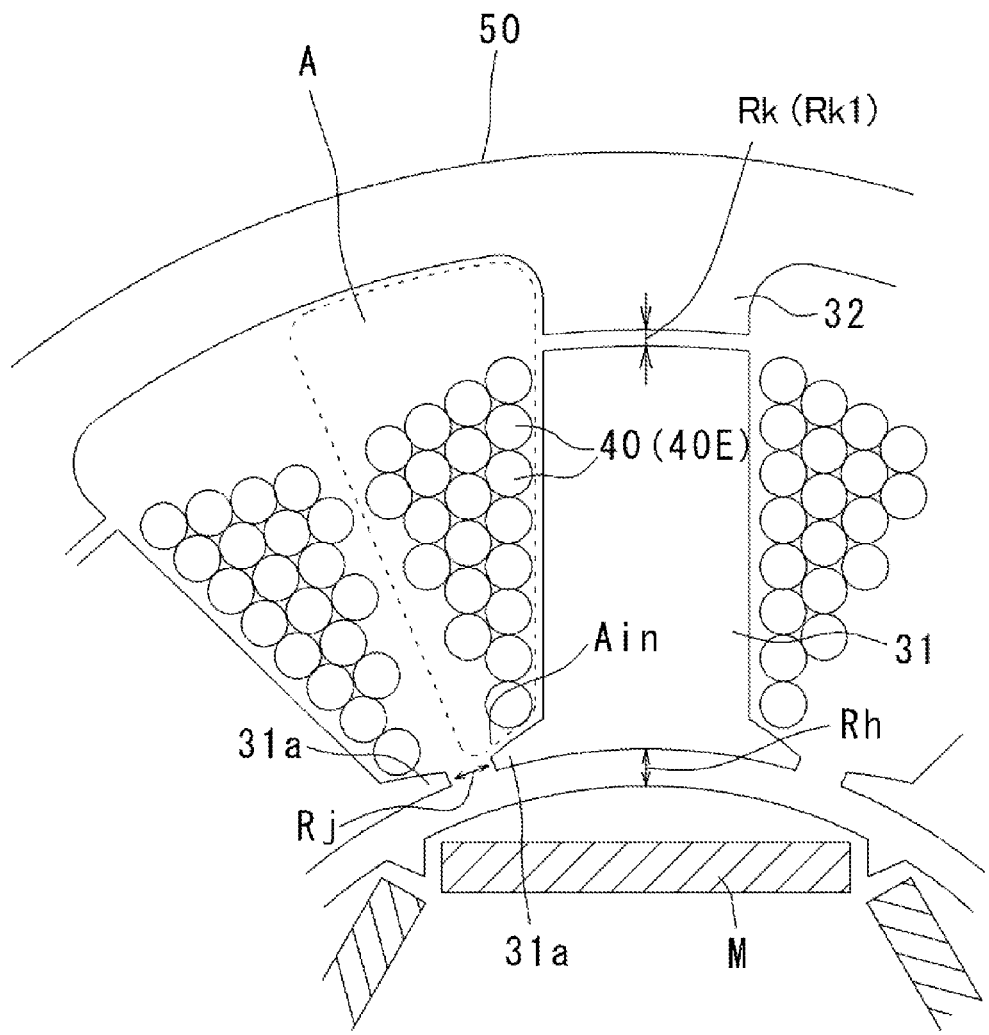
FIG. 6A is a partially enlarged cross-sectional view corresponding to FIG. 5A showing the electrical rotating machine according to a second embodiment of the present invention.
Figure 6B:
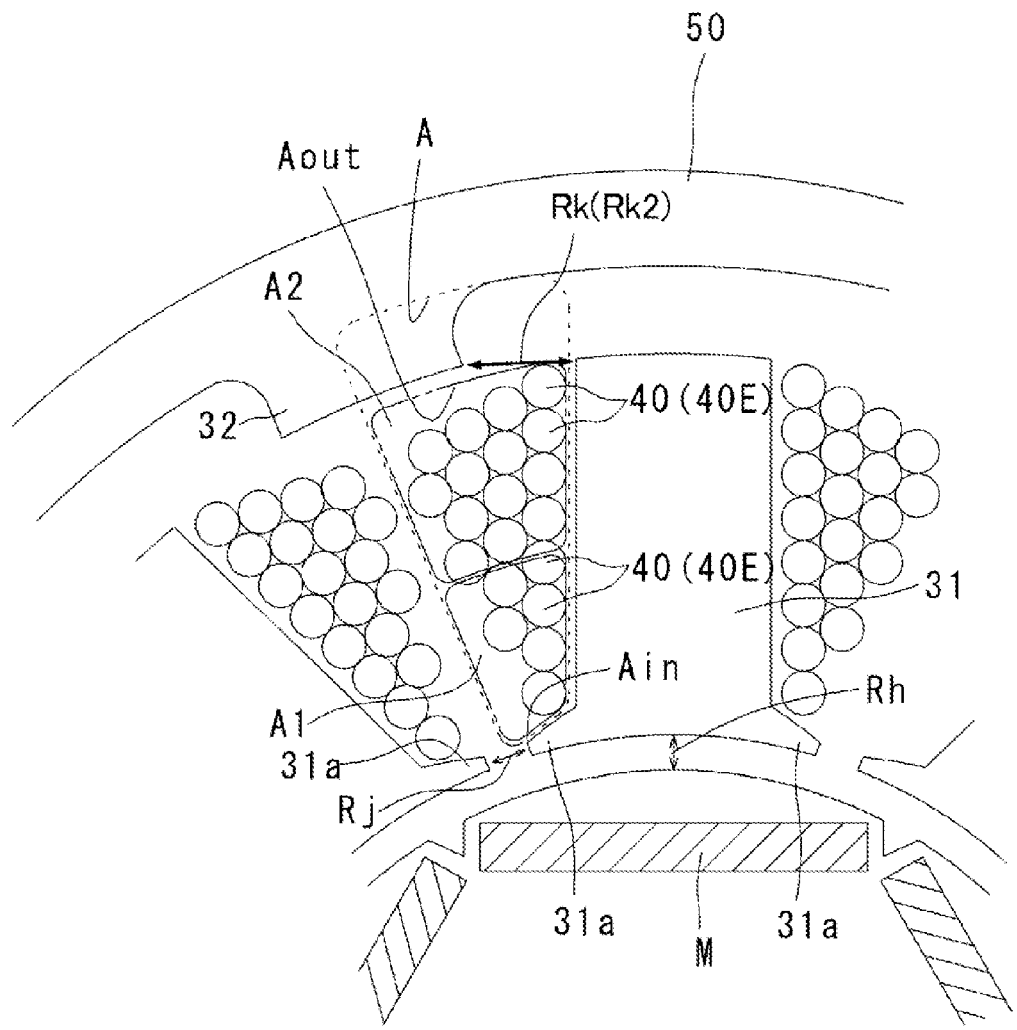
FIG. 6B is a partially enlarged cross-sectional view corresponding to FIG. 5B showing the electrical rotating machine according to the second embodiment of the present invention.

FIGS. 6A and 6B are enlarged cross-sectional views corresponding to FIGS. 5A and 5B showing the winding portion and therearound of the electric motor according to a second embodiment of the present invention. In the second embodiment, the winding 40 is formed in a region corresponding to the first tooth portion 31 in the winding arrangeable region A so that the number of turns increases from the rotor side end portion of the first tooth portion 31 toward the opposite side end portion to change the winding space factor.

Also in this embodiment, as shown in FIG. 6A, electricity is passed through the entire portion of the winding 40 in the first position in which the first tooth portion 31 and the second tooth portion 32 are arranged in a radially aligned manner, and therefore the winding 40 constitutes a current-carrying winding 40E that generates a magnetic field. On the other hand, as shown in FIG. 6B, also in the second position in which the second tooth portion 32 as a movable divided tooth portion is moved and arranged between the pair of the adjacent first tooth portions 31 and 31, electricity is passed through the entire portion of the winding 40 and therefore the entire portion of the winding 40 constitutes a current-carrying winding 40E which generates a magnetic field. Therefore, in this embodiment, the current-carrying winding 40E in the first position and the current-carrying winding 40E in the second position coincide with each other.

As shown in FIG. 6B, in a case in which the movable divided tooth portion 32 is relatively moved with respect to the other divided tooth portion 31 and is in the second position in which the magnetic resistance Rk (Rk2) of the magnetic path formed by both the divided tooth portions 31 and 32 are large, a region in the winding arrangeable region A from the stator side end Aout of the current-carrying winding 40 E through which an electric current is passed in the second position to the rotor side end Ain in the winding arrangeable region A is divided, at an intermediate position in the direction that the divided tooth portions 31 and 32 of the tooth portion 30 are arranged, into a first region A1 arranged on the rotor side and a second region A2 arranged on the stator yoke portion side as shown by the two dashed line.

The current-carrying winding space factor defined as the ratio $(S_{40E}/S_{A1})$ of the actual total winding cross-sectional area $S_{40E}$ of the current-carrying winding 40E existing in the first region A1 to the cross-sectional area $S_{A1}$ of the first region A1 is set to be relatively smaller than the current-carrying winding space factor defined as the ratio ($S_{40E}/S_{A2}$) of the actual total winding cross-sectional area $S_{40E}$ of the current-carrying winding 40E of the second region A2 to the cross-sectional area $S_{A2}$ of the second region A2.

Therefore, also in this embodiment, in the same manner as in the first embodiment, the maximum revolution speed can be increased by the positional control of the second tooth portion 32 with respect to the first tooth portion 31 to enlarge the operational range.

The other structure, functions and effects are the same as in the first embodiment, and therefore the explanation will be omitted by allotting the same reference numerals to the corresponding portions.

Third Embodiment

Figure 7A:
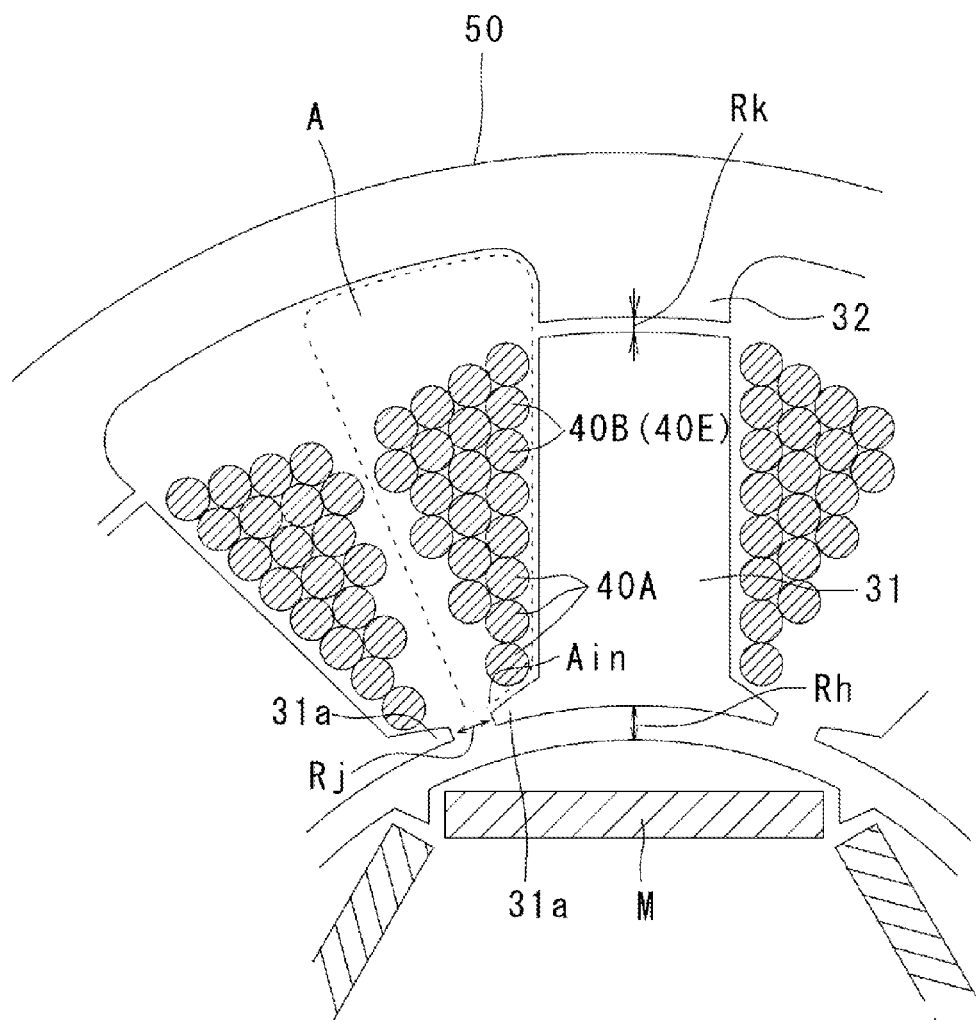
FIG. 7A is a partially enlarged cross-sectional view corresponding to FIG. 5A showing the electrical rotating machine according to a third embodiment of the present invention.
Figure 7B:
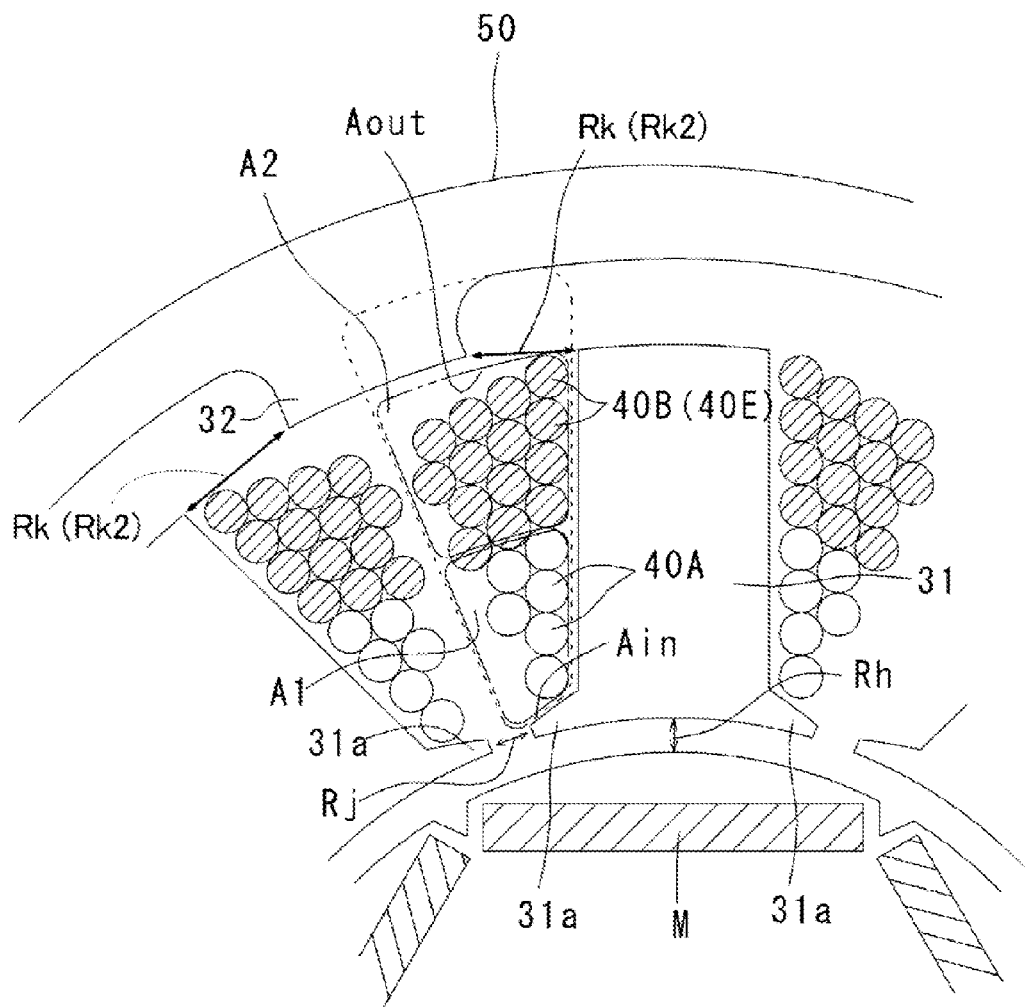
FIG. 7B is a partially enlarged cross-sectional view corresponding to FIG. 5B showing the electrical rotating machine according to the third embodiment of the present invention.

FIGS. 7A and 7B are enlarged cross-sectional views corresponding to FIGS. 5A and 5B showing the winding portion and therearound of the electric motor of a third embodiment according to the present invention. In this embodiment, as many as the windings 40 are arranged in the range between the rotor side end of the winding arrangeable region A and the stator yoke portion side end of the first tooth portion 31.

However, this embodiment is different from the aforementioned embodiments. In this embodiment, the winding 40 is constituted by two windings, i.e., a first winding 40A arranged on the rotor side and a second winding 40B arranged on the stator yoke portion side. In the first position state as shown in FIG. 7A, an electric current is passed through both of the first winding 40A and the second winding 40B. On the other hand, in the second position state as shown in FIG. 7B, the second winding 40B arranged on the stator yoke portion side constitutes a current-carrying winding 40E through which an electric current is passed, but the first winding 40A arranged on the rotor side constitutes a non-current-carrying winding through which no current is passed.

In this way, the first winding 40A is switched into a current-carrying state and a non-current-carrying state by a control circuit (not illustrated) at a predetermined timing. As shown in FIG. 7B, in the second position state in which the second tooth portion 32 as a movable divided tooth portion is relatively moved with respect to the first tooth portion 31, the current-carrying winding space factor is relatively smaller in the first region A1 than in the second region A2. In this way, the winding is constituted by a plurality of windings, and by selecting the current-carrying winding according to the relative position of the movable divided tooth portion with respect to the other divided tooth portion, the current-carrying winding space factor can be arbitrarily changed. Thus, the back electromotive force generated at the high revolution speed of the rotor can be decreased.

In the embodiment, the winding 40 is constituted by two types of windings, i.e., the first winding 40A arranged on the rotor end portion side and the second winding 40B arranged on the stator yoke portion side, but the present invention is not limited to that. For example, the winding 40 can be constituted by 3 or more windings. In such a case, the current-carrying winding space factor can be arbitrarily set in more detail by appropriately selecting the current-carrying winding through which an electric current is to be passed.

The other structure, functions and effects are the same as in the first embodiment, and therefore the explanation will be omitted by allotting the same reference numerals to the corresponding portions.

Fourth Embodiment

Figure 8A:
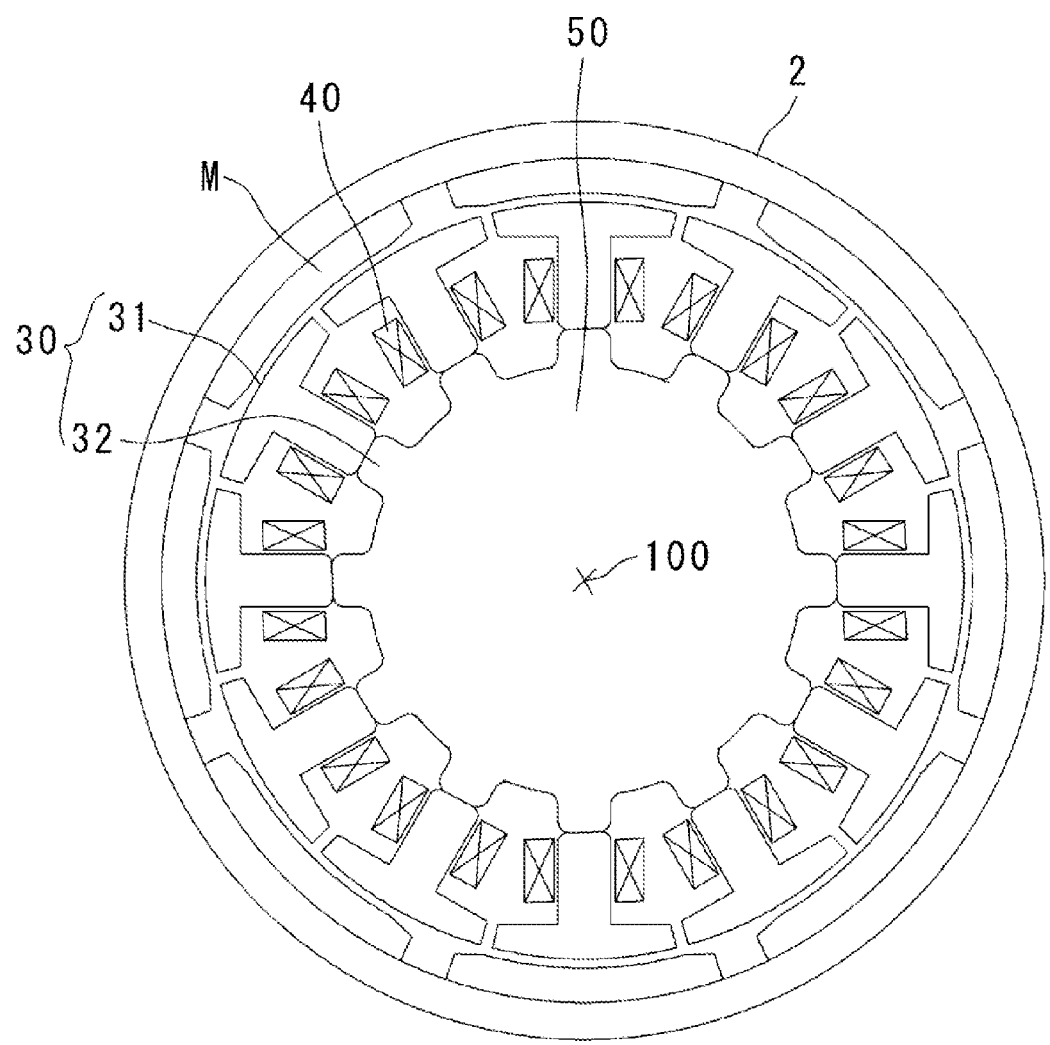
FIG. 8A is a cross-sectional view schematically showing main structural members of the electrical rotating machine according to a fourth embodiment of the present invention.
Figure 8B:
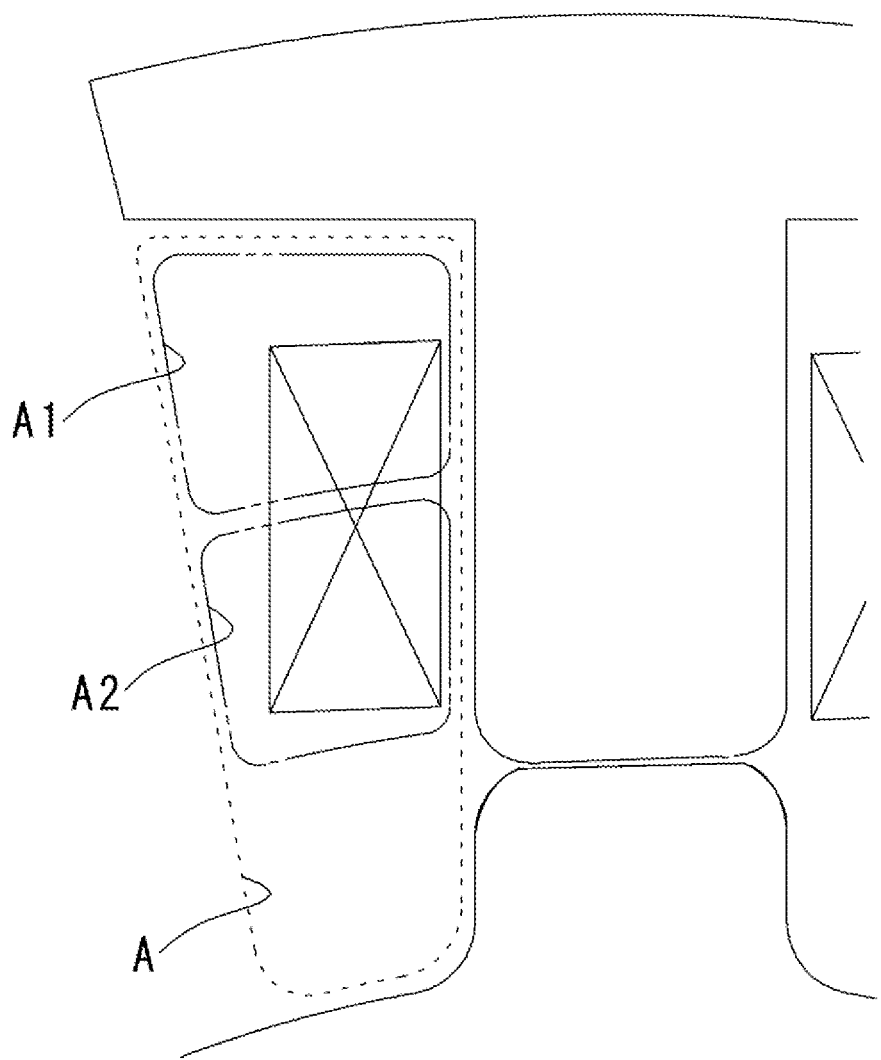
FIG. 8B is a partially enlarged cross-sectional view of the winding and the vicinity thereof according to the fourth embodiment.

FIGS. 8A and 8B show an electric motor of a fourth embodiment according to the present invention, and are schematic cross-sectional views corresponding to FIG. 4A. In the first to third embodiments, the rotor 2 is arranged inwardly of the stator 3. However, the fourth embodiment is different from the first to third embodiments in that the rotor 2 is arranged outwardly of the stator 3.

In FIGS. 8A and 8B, for an easy understanding of the structures of each portion by comparing to the first embodiment, the same reference numerals are allotted to the structural portions having the same function.

As shown in these drawings, this radial gap type electric motor includes a cylindrical rotor 2 configured to rotate about a rotation center (100 in the drawing), and a plurality of permanent magnet pieces M are arranged on the inner circumferential surface of the cylindrical rotor 2 in the circumferential direction. On the inner side of the rotor 2, a plurality of tooth portions 30 are arranged in the circumferential direction so as to face the permanent magnet pieces M via a predetermined gap. In the same manner as in the other embodiments, the tooth portion 30 is divided in the radial direction into a first tooth portion 31 arranged on the rotor side and a second tooth portion 32 arranged on the opposite side. The second tooth portion 32 is integrally formed on the stator yoke portion 50.

Also in this electric motor, the second tooth portion 32 is relatively movable with respect to the first tooth portion 31 in the circumferential direction. Also, a winding 40 is arranged on the periphery of the first tooth portion 31. The winding 40 is arranged in a state close to the stator yoke portion 50 side. Also, in this embodiment, the current-carrying space factor defined as a ratio of the actual winding total cross-sectional area $S_{40E}$ of the current-carrying winding 40E existing in the first region A1 to the cross-sectional area $S_{A1}$ of the first region A1 as defined in the present invention is set be relatively smaller than the current-carrying winding space factor as defined as a ratio of the actual total winding cross-sectional area $S_{40E}$ of the current-carrying winding 40E existing in the second region A2 to the cross-sectional area $S_{A2}$ of the second region A2.

Therefore, also in this embodiment, in the same manner as in the other embodiments, the maximum revolution speed can be increased by the positional control of the second tooth portion 32 with respect to the first tooth portion 31 to thereby enlarge the operational range. The other structure, functions and effects are the same as in the first embodiment, and therefore the explanation will be omitted by allotting the same reference numerals to the corresponding portions.

Fifth Embodiment

Figure 9:
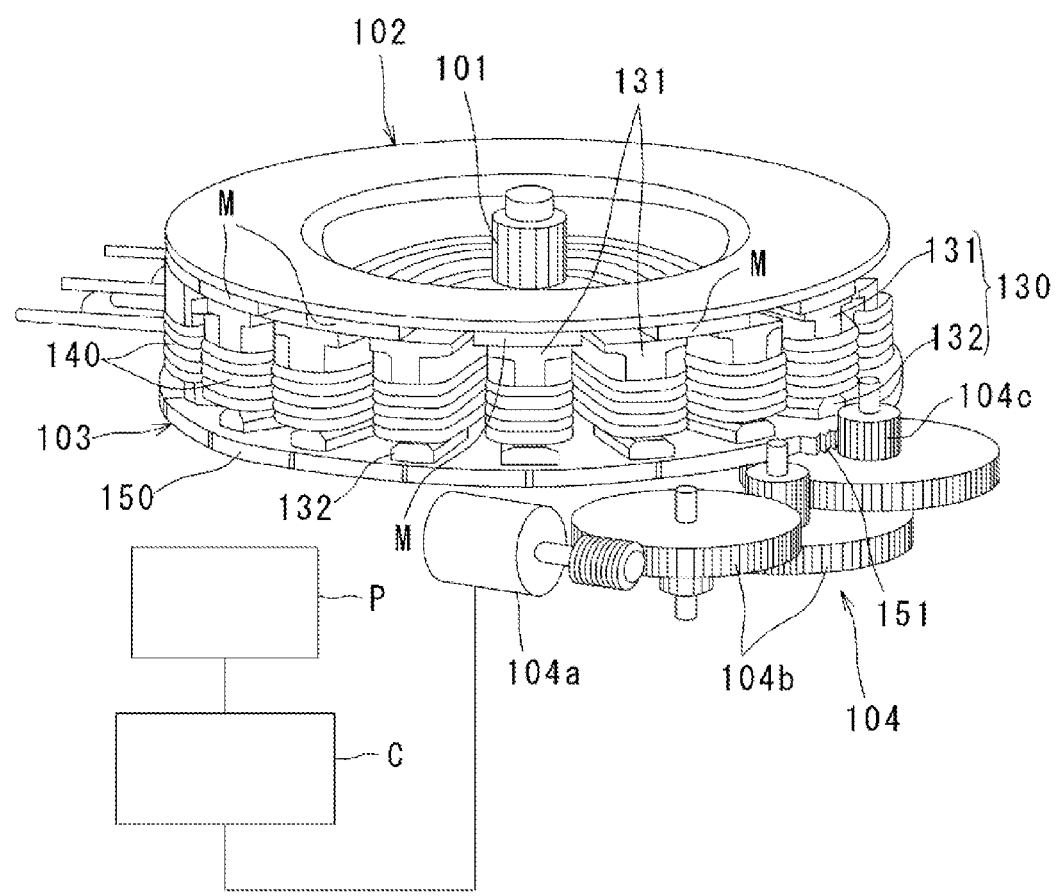
FIG. 9 is an entire perspective view of main structural members of an axial gap type electrical rotating machine according to a fifth embodiment of the present invention.

FIG. 9 is a perspective view showing a schematic structure of an electric motor of a fifth embodiment according to the present invention. The electric motor according to this fifth embodiment is an axial gap type electric motor, and includes a stator 103 having a stator winding 140 and a circular disc shaped rotor 102 having permanent magnets M and arranged in the axial direction of the stator 103 via a gap.

The rotor 102 is configured to rotate about the rotation axis 101. On the other hand, the stator 103 includes a plurality of tooth portions 130 each arranged so as to face one surface side of the rotor 102 via a gap and arranged in the circumferential direction at certain intervals. Each tooth portion 130 is divided in the axial direction into a first tooth portion 131 arranged closer to the rotor 102 and a second tooth portion 132 arranged on the opposite side. The stator 103 includes a disk shaped stator yoke portion 150 in which each second tooth portion 132 is fixed to one surface side. The stator yoke portion 150 is relatively and freely movable in the circumferential direction of the first tooth portion 131, together with the second tooth portion 132. The stator yoke portion 150 includes a gear portion 151 having a plurality of teeth partially formed on the peripheral edge of the stator yoke portion 150.

The electric motor includes a drive motor 104a and a drive mechanism 104 including a speed reduction mechanism 104b including a plurality of gears. The gear 104c of the speed reduction mechanism 104b is engaged with the gear portion 151. The drive motor 104a is freely ratably driven in opposite directions via a controller C with a power source P. When the drive motor 104a is driven, the rotational force is transmitted to the gear 104c via the speed reduction mechanism 104b, and transferred to the engaged gear portion 151. Therefore, the stator yoke portion 150 and the second tooth portion 132 are relatively moved with respect to the first tooth portion 131.

Also in this embodiment, in the same manner as in the other embodiments, the second tooth portion 132 is relatively and freely movable with respect to the first tooth portion 131 between a magnetic resistance minimum position where the magnetic resistance between the first tooth portion and the second tooth portion becomes minimum (first position) and a magnetic resistance maximum position where the magnetic resistance between the first tooth portion and the second tooth portion becomes maximum (second position).

The winding 140 is arranged on the stator side end portion of the first tooth portion 131 with a predetermined distance from the rotor side end of the stator 103 in an eccentrically-located state (eccentrically-located at the bottom portion in the drawing). Therefore, also in this embodiment, as explained in the other embodiments, the current-carrying space factor defined as the ratio of the actual winding total cross-sectional area $S_{40E}$ of the current-carrying winding 40E existing in the first region A1 to the cross-sectional area $S_{A1}$ of the first region A1 as defined in the present invention is set to be relatively smaller than the current-carrying winding space factor as defined as the ratio of the actual total winding cross-sectional area $S_{40E}$ of the current-carrying winding 40E existing in the second region A2 to the cross-sectional area $S_{A2}$ of the region A2.

Therefore, also in this embodiment, in the same manner as in the other embodiments, the maximum revolution speed can be increased by the positional control of the second tooth portion 132 with respect to the first tooth portion 131 to thereby enlarge the operational range. The other structure, functions and effects are the same as in the first embodiment, and therefore the explanation will be omitted by allotting the same reference numerals to the corresponding portions.

In each of the aforementioned embodiments, the explanation was made by exemplifying the case in which the winding 40 and 140 is arranged only around the first tooth portion 31 and 131, but the winding can be arranged also on the second tooth portion 32 and 132.

It should be understood that the terms and expressions used herein are used for explanation and have no intention to be used to construe in a limited manner, do not eliminate any equivalents of features shown and mentioned herein, and allow various modifications falling within the claimed scope of the present invention.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to."

INDUSTRIAL APPLICABILITY

The rotary electric machine of the present invention can be preferably used as an electric motor as a driving force for, e.g., various electric vehicles including electric motorcycles, and various electric machines.

The invention claimed is:
1. An electric rotating machine, comprising:
a rotor having a permanent magnet and configured to rotate about a rotation axis; and
a stator arranged so as to face the rotor via a gap, the stator including
a tooth portion arranged so as to face the rotor via the gap,
a stator yoke portion forming a stator magnetic path together with the tooth portion,
a current-carrying winding arranged so as to occupy a winding arrangeable region surrounded by the stator yoke portion and the tooth portion, and
a magnetic resistance changing mechanism configured to change a magnetic resistance of the stator magnetic path by mechanically changing said stator magnetic path, and being configured to mechanically change the stator magnetic path between a first state and a second state,
wherein in the second state the magnetic resistance of the stator magnetic path is larger than that in the first state, and an electric current passes through the current-carrying winding in both the first and second states,
wherein the winding arrangeable region has a predetermined region ranging from a first end of the predetermined region to a second end of the predetermined region, the first end being at a stator yoke portion side end of the current-carrying winding, the stator yoke portion side end of the current-carrying winding being disposed closer to the stator yoke portion than any other portion of the current-carrying winding, the second end being at a rotor side end of the winding arrangeable region,
wherein the predetermined region is divided at an intermediate position of the tooth portion into a first region arranged on a rotor side and a second region arranged on a stator yoke portion side that is disposed closer to the stator yoke portion than the first region, and
wherein a first current-carrying winding space factor is defined by a ratio of a total winding cross-sectional area of the current-carrying winding in the first region relative to a cross-sectional area of the first region, wherein a second current-carrying winding space factor is defined by a ratio of a total winding cross-sectional area of the current-carrying winding in the second region to a cross-sectional area of the second region, and wherein the first current-carrying winding space factor is less than the second current-carrying winding space factor.

2. The electric rotating machine as recited in claim 1,
wherein the tooth portion is divided at a position thereof in a direction from a rotor side end portion toward an opposite side end portion thereof to include a plurality of divided tooth portions, wherein at least one of the divided tooth portions is a movable divided tooth portion that is movable in a circumferential direction of the stator relative to another of the divided tooth portions, and wherein the movable divided tooth portion is movable in the circumferential direction so that the magnetic resistance of the stator magnetic path changes from the first state to the second state or from the second state to the first state.

3. The electric rotating machine as recited in claim 1,
wherein a rotor side end of the current-carrying winding is arranged closer to the rotor than any other portion of the current-carrying winding and is disposed a predetermined distance, greater than zero, from the second end of the predetermined region in a direction toward the first end of the predetermined region, and wherein no winding is formed in a no-winding portion of the first region.

4. The electric rotating machine as recited in claim 3,
wherein the stator includes a winding fixing member for fixing the current-carrying winding, the winding fixing member is arranged in the no-winding portion and between the rotor side end of the current-carrying winding and the second end of the predetermined region.

5. The electric rotating machine as recited in claim 1,
wherein the current-carrying winding is arranged to be eccentrically-located so as to have more turns around the tooth portion in the second region than that in the first region.

6. The electric rotating machine as recited in claim 1,
wherein the current-carrying winding is formed so that a number of turns increases in the winding arrangeable region in a direction from the first region to the second region.

7. A vehicle equipped with the electric rotating machine as recited in claim 1.

8. An electric product equipped with the electric rotating machine as recited in claim 1.

9. An electric rotating machine comprising:
a rotor having a permanent magnet and configured to rotate about a rotation axis; and
a stator arranged so as to face the rotor via a gap, the stator including
a tooth part arranged so as to face the rotor via the gap, wherein the tooth part is divided into a plurality of divided tooth portions at a position disposed in a direction from a rotor side end of the tooth part, that is disposed closer to the rotor than any other portion of the tooth part, towards an opposite side end portion thereof that is opposite to the rotor side end, the plurality of divided tooth portions including a first tooth portion arranged so as to face the rotor via the gap and a second tooth portion being arranged on the opposite side end portion of the tooth part relative to the first tooth portion,
a stator yoke portion fixed to the second tooth portion, and
a current-carrying winding occupying a winding arrangeable region surrounded by the tooth part and the stator yoke portion, wherein one of the first tooth portion and the second tooth portion is a movable divided tooth portion relatively movable with respect to the other of the first tooth portion and the second tooth portion, and wherein the movable divided tooth portion is movable between a first position and a second position in which a magnetic resistance of a magnetic path formed by the divided tooth portions is relatively larger than that of the first position, and an electric current passes through the current-carrying winding in both the first and second positions, wherein the winding arrangeable region has a predetermined region ranging from a first end of the predetermined region to a second end of the predetermined region, the first end being at a stator yoke portion side end of the current-carrying winding, the stator yoke portion side end of the current-carrying winding being disposed closer to the stator yoke portion than any other portion of the current-carrying winding, the second end being at a rotor side end of the winding arrangeable region, wherein the predetermined region is divided at an intermediate position of the tooth part in a radial direction of the rotor into a first region arranged on a rotor side and a second region arranged on a stator yoke portion side that is disposed closer to the stator yoke portion than the first region, and wherein a first current-carrying winding space factor is defined by a ratio of a total winding cross-sectional area of the current-carrying winding in the first region to a cross-sectional area of the first region, wherein a second current-carrying winding space factor is defined by a ratio of a total winding cross-sectional area of the current-carrying winding in the second region to a cross-sectional area of the second region, and wherein the first current-carrying winding space factor is less than the second current-carrying winding space factor.

10. The electric rotating machine as recited in claim 9,
wherein a rotor side end of the current-carrying winding is arranged closer to the rotor than any other portion of the current-carrying winding and is disposed a predetermined distance, greater than zero, from the second end of the predetermined region toward the first end of the predetermined region, and wherein no winding is formed in a no-winding portion of the first region.

11. The electric rotating machine as recited in claim 10,
wherein the stator includes a winding fixing member for fixing the current-carrying winding, the winding fixing member being arranged between the rotor side end of the current-carrying winding and the second end of the predetermined region.

12. The electric rotating machine as recited in claim 9,
wherein the current-carrying winding is arranged to be eccentrically-located so as to have more turns around the tooth part in the second region than that in the first region.

13. The electric rotating machine as recited in claim 9,
wherein the current-carrying winding is formed so that a number of turns increases in the winding arrangeable region in a direction from the first region to the second region.

14. The electric rotating machine as recited in claim 9,
wherein the rotor includes a columnar rotor main body and the permanent magnet is arranged at an outer peripheral edge portion of the rotor main body,
wherein the stator includes a cylindrical first stator portion having the first tooth portion, the stator further including a cylindrical second stator portion arranged outside of the first stator portion in said radial direction, and
wherein the second stator portion is movable in a circumferential direction thereof relative to the first stator portion and the second tooth portion is the movable divided tooth portion.

15. The electric rotating machine as recited in claim 9,
wherein the rotor includes a columnar rotor main body and the permanent magnet includes a plurality of permanent magnets disposed in an outer peripheral edge portion of the rotor main body along a circumferential direction of the rotor main body and at certain intervals, the magnets being embedded and not exposed from the rotor main body.

16. The electric rotating machine as recited in claim 9,
wherein the permanent magnet is a Neodymium permanent magnet.

17. The electric rotating machine as recited in claim 9,
wherein the first tooth portion includes a body portion and a pair of side protruded portions extending in a circumferential direction of the stator at two sides of a rotor side end portion of the body portion.

18. The electric rotating machine as recited in a claim 17,
wherein the tooth part is a first tooth part and the electric rotating machine further comprises a second tooth part adjacent the first tooth part, the second tooth part having a pair of side protruded portions extending in the circumferential direction of the stator at two sides of a rotor side end portion of a body portion thereof,
wherein in a state in which the movable divided tooth portion is arranged at the first position, a magnetic resistance of a path extending from the rotor side end portion of the first tooth part to the rotor side end portion of the second tooth part via the stator yoke portion is set to be smaller than a magnetic resistance between the pairs of adjacent side protruded portions, and
wherein in a state in which the movable divided tooth portion is arranged at the second position, the magnetic resistance of said path is set to be larger than the magnetic resistance between the pairs of adjacent side protruded portions.

19. An electric rotating machine comprising:
a rotor having a permanent magnet and configured to rotate about a rotation axis; and
a stator arranged so as to face the rotor via a gap, the stator including
a tooth part arranged so as to face the rotor via the gap, wherein the tooth part is divided into a plurality of divided tooth portions at a position disposed in a direction from a rotor side end of the tooth part, that is disposed closer to the rotor than any other portion of the tooth part, towards an opposite side end portion thereof that is opposite to the rotor side end, the plurality of divided tooth portions including a first tooth portion arranged so as to face the rotor via the gap and a second tooth portion being arranged on the opposite side end portion of the tooth part relative to the first tooth portion,
a stator yoke portion fixed to the second tooth portion, and
a current-carrying winding occupying a winding arrangeable region surrounded by the tooth part and the stator yoke portion,
wherein one of the first tooth portion and the second tooth portion is a movable divided tooth portion relatively movable with respect to the other of the first tooth portion and the second tooth portion, and
wherein the movable divided tooth portion is movable between a first position and a second position in which a magnetic resistance of a magnetic path formed by the divided tooth portions is relatively larger than that of the first position, and an electric current passes through the current-carrying winding in both the first and second positions,
wherein the winding arrangeable region has a predetermined region ranging from a first end of the predetermined region to a second end of the predetermined region, the first end being at a stator yoke portion side end of the current-carrying winding, the stator yoke portion side end portion of the current-carrying winding, the second end being at a rotor side end of the winding arrangeable region,
wherein the predetermined region is divided at an intermediate position of the tooth part in an axial direction of the rotor into a first region arranged on a rotor side and a second region arranged on a stator yoke portion side that is disposed closer to the stator yoke portion than the first region, and
wherein a first current-carrying winding space factor is defined by a ratio of a total winding cross-sectional area of the current-carrying winding in the first region to a cross-sectional area of the first region,
wherein a second current-carrying winding space factor is defined by a ratio of a total winding cross-sectional area of the current-carrying winding in the second region to a cross-sectional area of the second region,
wherein the first current-carrying winding space factor is less than the second current-carrying winding space factor,
wherein the rotor includes a circular plate shaped rotor main body rotatable about the rotation axis, and the permanent magnet is arranged on one surface of the rotor main body, and
wherein the stator is arranged so as to face the rotor main body in an axial direction of the rotor main body.

20. The electric rotating machine as recited in claim 19,
wherein the permanent magnet includes a plurality of permanent magnets on the one surface of the rotor main body that are disposed at intervals along a circumferential direction of the rotor main body, the permanent magnets being exposed from the rotor main body.

* * * * *